United States Patent
Ho et al.

(10) Patent No.: US 10,390,187 B2
(45) Date of Patent: *Aug. 20, 2019

(54) METHOD AND APPARATUS FOR PROVIDING SHARED SCHEDULING REQUEST RESOURCES

(71) Applicant: QUALCOMM Incorporated, San Diego, CA (US)

(72) Inventors: Sai Yiu Duncan Ho, San Diego, CA (US); Wanshi Chen, San Diego, CA (US); Juan Montojo, San Diego, CA (US); Parag Arun Agashe, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/140,935

(22) Filed: Sep. 25, 2018

(65) Prior Publication Data

US 2019/0028856 A1    Jan. 24, 2019

Related U.S. Application Data

(63) Continuation of application No. 12/973,122, filed on Dec. 20, 2010, now Pat. No. 10,187,758.

(Continued)

(51) Int. Cl.
*G06F 9/50* (2006.01)
*H04W 4/08* (2009.01)
(Continued)

(52) U.S. Cl.
CPC ............. *H04W 4/08* (2013.01); *H04W 8/186* (2013.01); *H04W 74/08* (2013.01)

(58) Field of Classification Search
CPC ..................................................... H04W 4/08
See application file for complete search history.

(56) References Cited

U.S. PATENT DOCUMENTS

| | | |
|---|---|---|
| 2007/0201503 A1 | 8/2007 | Nishio |
| 2007/0223374 A1 | 9/2007 | Popovski et al. |

(Continued)

FOREIGN PATENT DOCUMENTS

| | | |
|---|---|---|
| CN | 1897576 A | 1/2007 |
| CN | 101605024 A | 12/2009 |

(Continued)

OTHER PUBLICATIONS

3rd Generation Partnership Project, Technical Specification Group Radio Access Network, Evolved Universal Terrestrial Radio Access (E-UTRA) Medium Access Control (MAC) protocol specification (Release 8), 3GPP Standard, 3GPP TS 36.321, 3rd Generation Partnership Project (3GPP), Mobile Competence Centre, 650, Route Des Lucioles, F-06921 Sophia-Antipolis Cedex, France, No. V8.7.0, Sep. 1, 2009 (Sep. 1, 2009), pp. 1-44, XP050377623.

(Continued)

*Primary Examiner* — Sulaiman Nooristany
(74) *Attorney, Agent, or Firm* — Arent Fox, LLP

(57) ABSTRACT

In accordance with one or more embodiments and corresponding disclosure thereof, various aspects are described in connection with providing shared scheduling request (SR) resources to devices for transmitting SRs. Identifiers related to the shared SR resources can be signaled to the devices along with indications of the shared SR resources in given time durations. Thus, devices can transmit an SR over shared SR resources related to one or more received identifiers for obtaining an uplink grant. This can decrease delay associated with receiving uplink grants since the device need not wait for dedicated SR resources before transmitting the SR. In addition, overhead can be decreased on control channels, as compared to signaling dedicated SR resources and/or uplink grants. Moreover, identifiers related to SR resources can correspond to a grouping of devices, such that a device can transmit over shared SR resources related to a group including the device.

20 Claims, 15 Drawing Sheets

Related U.S. Application Data

(60) Provisional application No. 61/290,747, filed on Dec. 29, 2009.

(51) Int. Cl.
*H04W 8/18* (2009.01)
*H04W 74/08* (2009.01)

(56) References Cited

U.S. PATENT DOCUMENTS

| | | | |
|---|---|---|---|
| 2008/0043771 A1 | 2/2008 | Cho et al. | |
| 2009/0116434 A1* | 5/2009 | Lohr | H04L 5/0007 370/329 |
| 2009/0239590 A1 | 9/2009 | Parkvall | |
| 2011/0230237 A1 | 9/2011 | Nishio | |
| 2011/0292895 A1* | 12/2011 | Wager | H04L 5/0007 370/329 |
| 2011/0321050 A1 | 12/2011 | Ho et al. | |
| 2013/0010729 A1* | 1/2013 | Novak | H04L 1/14 370/329 |

FOREIGN PATENT DOCUMENTS

| | | |
|---|---|---|
| EP | 1739891 A1 | 1/2007 |
| JP | 2006054860 A | 2/2006 |
| JP | 2007013908 A | 1/2007 |
| JP | 2008166879 A | 7/2008 |
| JP | 2008235962 A | 10/2008 |
| JP | 2010503337 A | 1/2010 |
| WO | 2008030856 A2 | 3/2008 |
| WO | 2009033280 A1 | 3/2009 |
| WO | 2009035301 A2 | 3/2009 |
| WO | 2009038381 A2 | 3/2009 |

OTHER PUBLICATIONS

Contention based uplink transmissions, 3GPP TSG-RAN WG2 #66bis, R2-093812, Los Angeles, USA, Jun. 29-Jul. 3, 2009.
International Preliminary Report on Patentability—PCT/US2010/062051—The International Bureau of WIPO—Geneva, Switzerland, Jul. 12, 2012.
International Search Report and Written Opinion—PCT/US2010/062051, International Search Authority—European Patent Office—Apr. 6, 2011.
Jungnickel .V, et al., "Implementation concepts for distributed cooperative transmission", Signals, Systems and Computers, 2008 42nd Asilomar Conference on, IEEE, Piscataway, NJ, USA, Oct. 26, 2008 (Oct. 26, 2008), pp. 1035-1039, XP031475445, ISBN: 978-1-4244-2940-0.
Taiwan Search Report—TW099146404—TIPO—Jul. 11, 2013.

* cited by examiner

METHOD AND APPARATUS FOR PROVIDING SHARED SCHEDULING REQUEST RESOURCES

CROSS-REFERENCE TO RELATED APPLICATION

The present application for patent claims is a continuation of Non-Provisional application Ser. No. 12/973,122 entitled "Method and Apparatus for providing Shared Scheduling Request Resources," filed Dec. 20, 2010, which claims priority to Provisional Application No. 61/290,747 entitled "LTE SCHEDULING REQUEST OVERLOADING," filed Dec. 29, 2009, and assigned to the assignee hereof and hereby expressly incorporated by reference herein.

BACKGROUND

Field

The following description relates generally to wireless communications, and more particularly to communication of scheduling requests.

Background

Wireless communication systems are widely deployed to provide various types of communication content such as, for example, voice, data, and so on. Typical wireless communication systems may be multiple-access systems capable of supporting communication with multiple users by sharing available system resources (e.g., bandwidth, transmit power, . . . ). Examples of such multiple-access systems may include code division multiple access (CDMA) systems, time division multiple access (TDMA) systems, frequency division multiple access (FDMA) systems, orthogonal frequency division multiple access (OFDMA) systems, and the like. Additionally, the systems can conform to specifications such as third generation partnership project (3GPP), 3GPP long term evolution (LTE), ultra mobile broadband (UMB), evolution data optimized (EV-DO), etc.

Generally, wireless multiple-access communication systems may simultaneously support communication for multiple mobile devices. Each mobile device may communicate with one or more base stations via transmissions on forward and reverse links. The forward link (or downlink) refers to the communication link from base stations to mobile devices, and the reverse link (or uplink) refers to the communication link from mobile devices to base stations. Further, communications between mobile devices and base stations may be established via single-input single-output (SISO) systems, multiple-input single-output (MISO) systems, multiple-input multiple-output (MIMO) systems, and so forth. In addition, mobile devices can communicate with other mobile devices (and/or base stations with other base stations) in peer-to-peer wireless network configurations.

Moreover, for example, a base station can configure dedicated scheduling request (SR) resources to one or more devices to facilitate communicating SRs for uplink resources. In this regard, when a device needs to transmit user plane data, the device can wait for SR resources, transmit an SR over the SR resources, and receive an uplink grant from the base station, over which the devices can begin transmitting the user plane data. Latency associated with obtaining the uplink grant can be reduced at least in part by configuring the dedicated SR resources at frequent time intervals (e.g., to reduce the wait time for such resources at the device); however, this can also introduce overhead to an associated control channel over which the dedicated SR resources are configured for the device.

In one proposed solution to this issue, a device can receive contention-based radio network temporary identifiers (CB-RNTI) from a base station at frequent time intervals (e.g., 1 or 2 ms in LTE) related to uplink grants and can monitor control resources for contention-based uplink grants on a shared resource channel (e.g., physical uplink shared channel (PUSCH) in LTE). When the device needs to transmit user plane data, it can receive a contention-based grant in the given time interval and transmit the data thereover. In this solution, devices can collide over the uplink resource grant. In an example, where the number of devices at a base station increases, however, the time required to recover from the collisions over the shared resource channel may outweigh the time savings of allowing the devices to obtain the contention-based grant without waiting for SR resources for requesting the grants.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

In accordance with one or more embodiments and corresponding disclosure thereof, various aspects are described in connection with providing shared scheduling request (SR) resources to devices for transmitting SRs. Identifiers related to the shared SR resources can be signaled to the devices along with indications of the shared SR resources in given time durations. Thus, devices can transmit an SR over shared SR resources related to one or more received identifiers for obtaining an uplink grant. This can decrease delay associated with receiving uplink grants since the device need not wait for dedicated SR resources before transmitting the SR. In addition, overhead can be decreased on control channels, as compared to signaling dedicated SR resources and/or uplink grants. Moreover, identifiers related to SR resources can correspond to a grouping of devices, such that a device can transmit over shared SR resources related to a group including the device.

According to an example, a method of wireless communication is provided that includes receiving a group identifier associated with transmitting an SR over a shared SR resource and receiving the shared SR resource associated with the group identifier from an evolved Node B (eNB). The method further includes transmitting the SR over the shared SR resource.

In another aspect, an apparatus for utilizing shared SR resources is provided that includes at least one processor configured to obtain a group identifier associated with transmitting an SR over a shared SR resource and obtain the shared SR resource associated with the group identifier from an eNB. The at least one processor is further configured to transmit the SR over the shared SR resource. In addition, the wireless communications apparatus includes a memory coupled to the at least one processor.

In yet another aspect, an apparatus for utilizing shared SR resources is provided that includes means for receiving a group identifier associated with transmitting an SR over a shared SR resource and means for receiving the shared SR resource associated with the group identifier from an eNB. The apparatus further includes means for transmitting the SR over the shared SR resource.

Still, in another aspect, a computer-program product is provided for utilizing shared SR resources including a computer-readable medium having code for causing at least one computer to obtain a group identifier associated with transmitting an SR over a shared SR resource. The computer-readable medium further includes code for causing the at least one computer to obtain the shared SR resource associated with the group identifier from an eNB and code for causing the at least one computer to transmit the SR over the shared SR resource.

According to another example, a method for providing shared SR resources is provided that includes indicating a shared SR resource associated with a group identifier of at least one group of user equipments (UE) and receiving an SR from a UE over the shared SR resource. The method also includes transmitting an uplink grant to the UE based at least in part on the SR.

In another aspect, an apparatus for providing shared SR resources is provided that includes at least one processor configured to specify a shared SR resource associated with a group identifier of at least one group of UEs. The at least one processor is further configured to obtain an SR from a UE over the shared SR resource and provide an uplink grant to the UE based at least in part on the SR. In addition, the wireless communications apparatus includes a memory coupled to the at least one processor.

In yet another aspect, an apparatus for providing shared SR resources is provided that includes means for indicating a shared SR resource associated with a group identifier of at least one group of UEs. The apparatus further includes means for receiving an SR from a UE over the shared SR resource and means for transmitting an uplink grant to the UE based at least in part on the SR.

Still, in another aspect, a computer-program product is provided for providing shared SR resources including a computer-readable medium having code for causing at least one computer to specify a shared SR resource associated with a group identifier of at least one group of UEs. The computer-readable medium further includes code for causing the at least one computer to obtain an SR from a UE over the shared SR resource and code for causing the at least one computer to provide an uplink grant to the UE based at least in part on the SR.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

The disclosed aspects will hereinafter be described in conjunction with the appended drawings, provided to illustrate and not to limit the disclosed aspects, wherein like designations denote like elements, and in which.

DETAILED DESCRIPTION

Figure 1:
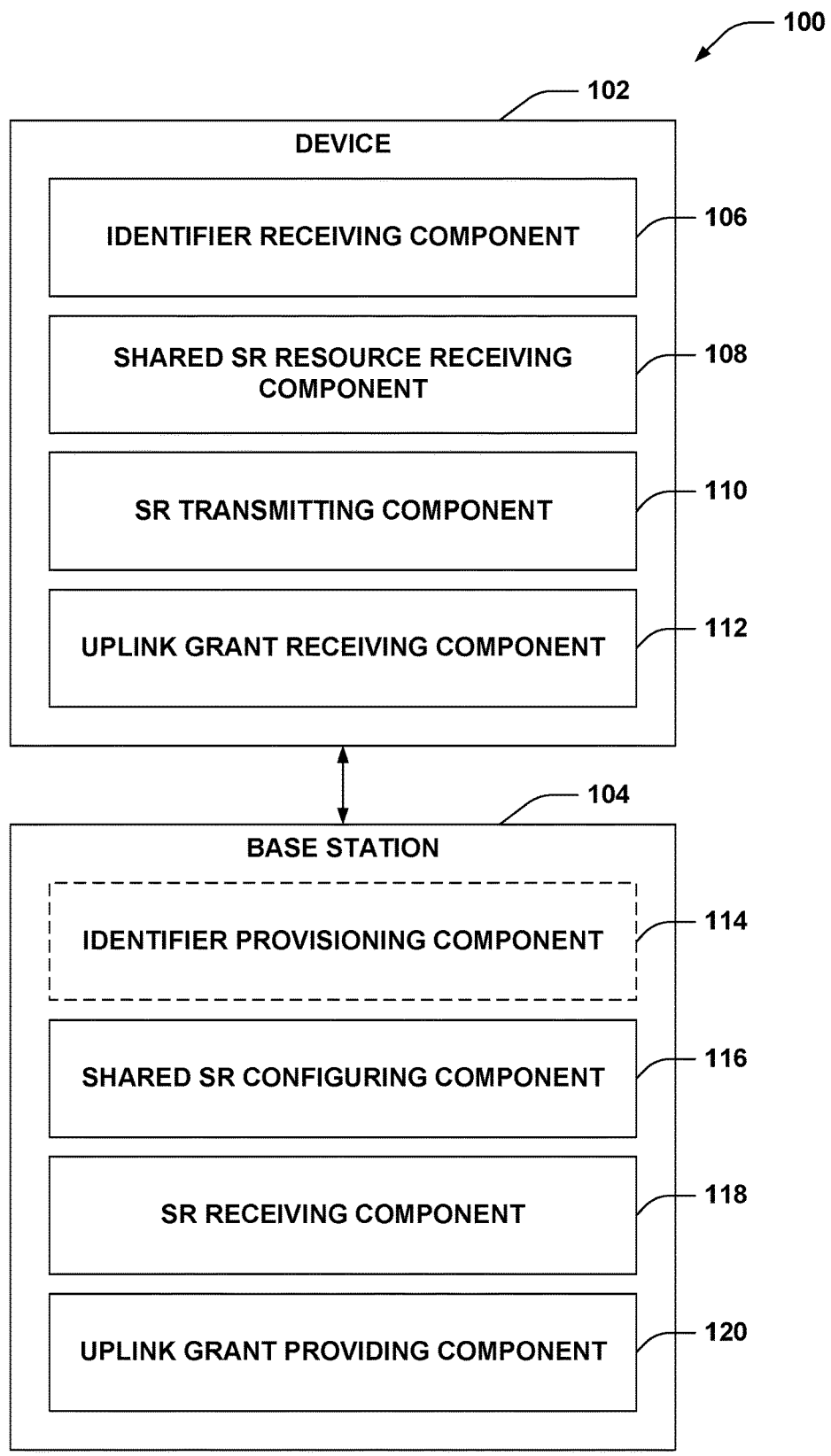
FIG. 1 illustrates an example system for communicating scheduling requests (SR) over shared SR resources.

Various aspects are now described with reference to the drawings. In the following description, for purposes of explanation, numerous specific details are set forth in order to provide a thorough understanding of one or more aspects. It may be evident, however, that such aspect(s) may be practiced without these specific details.

As described further herein, shared scheduling request (SR) resources can be provided to devices for transmitting SRs (e.g., when uplink grants are desired to transmit user plane data). For example, identifiers related to the shared SR resources can be signaled to the devices along with indications of the shared SR resources in given time durations (e.g., every n milliseconds (ms), where n is a positive integer). Thus, devices can transmit an SR over shared SR resources related to one or more received identifiers when an uplink grant is desired. This can decrease delay associated with receiving uplink grants since the device need not wait for dedicated SR resources before transmitting the SR. In addition, overhead can be decreased on control channels, as compared to signaling dedicated SR resources and/or uplink grants, which are used in other implementations. Moreover, identifiers related to SR resources can correspond to a grouping of devices, such that a device can transmit an SR over shared SR resources related to a group that includes the device. For example, devices can be grouped according to channel conditions at the device, quality-of-service (QoS) related to the device, and/or substantially any similar properties between devices. In this example, SR power control and/or periodicity of indicating shared SR resources can be applied for the groups of devices.

As used in this application, the terms "component," "module," "system" and the like are intended to include a computer-related entity, such as but not limited to hardware, firmware, a combination of hardware and software, software, or software in execution. For example, a component may be, but is not limited to being, a process running on a processor, a processor, an object, an executable, a thread of execution, a program, and/or a computer. By way of illustration, both an application running on a computing device and the computing device can be a component. One or more components can reside within a process and/or thread of execution and a component may be localized on one computer and/or distributed between two or more computers. In addition, these components can execute from various computer readable media having various data structures stored thereon. The components may communicate by way of local and/or remote processes such as in accordance with a signal having one or more data packets, such as data from one component interacting with another component in a local system, distributed system, and/or across a network such as the Internet with other systems by way of the signal.

Furthermore, various aspects are described herein in connection with a terminal, which can be a wired terminal or a wireless terminal. A terminal can also be called a system, device, subscriber unit, subscriber station, mobile station, mobile, mobile device, remote station, remote terminal, access terminal, user terminal, terminal, communication device, user agent, user device, or user equipment (UE). A wireless terminal may be a cellular telephone, a satellite phone, a cordless telephone, a Session Initiation Protocol (SIP) phone, a wireless local loop (WLL) station, a personal digital assistant (PDA), a handheld device having wireless connection capability, a computing device, or other processing devices connected to a wireless modem. Moreover, various aspects are described herein in connection with a base station. A base station may be utilized for communicating with wireless terminal(s) and may also be referred to as an access point, a Node B, evolved Node B (eNB), or some other terminology.

Moreover, the term "or" is intended to mean an inclusive "or" rather than an exclusive "or." That is, unless specified otherwise, or clear from the context, the phrase "X employs A or B" is intended to mean any of the natural inclusive permutations. That is, the phrase "X employs A or B" is satisfied by any of the following instances: X employs A; X employs B; or X employs both A and B. In addition, the articles "a" and "an" as used in this application and the appended claims should generally be construed to mean "one or more" unless specified otherwise or clear from the context to be directed to a singular form.

The techniques described herein may be used for various wireless communication systems such as CDMA, TDMA, FDMA, OFDMA, SC-FDMA and other systems. The terms "system" and "network" are often used interchangeably. A CDMA system may implement a radio technology such as Universal Terrestrial Radio Access (UTRA), cdma2000, etc. UTRA includes Wideband-CDMA (W-CDMA) and other variants of CDMA. Further, cdma2000 covers IS-2000, IS-95 and IS-856 standards. A TDMA system may implement a radio technology such as Global System for Mobile Communications (GSM). An OFDMA system may implement a radio technology such as Evolved UTRA (E-UTRA), Ultra Mobile Broadband (UMB), IEEE 802.11 (Wi-Fi), IEEE 802.16 (WiMAX), IEEE 802.20, Flash-OFDM®, etc. UTRA and E-UTRA are part of Universal Mobile Telecommunication System (UMTS). 3GPP Long Term Evolution (LTE) is a release of UMTS that uses E-UTRA, which employs OFDMA on the downlink and SC-FDMA on the uplink. UTRA, E-UTRA, UMTS, LTE and GSM are described in documents from an organization named "3rd Generation Partnership Project" (3GPP). Additionally, cdma2000 and UMB are described in documents from an organization named "3rd Generation Partnership Project 2" (3GPP2). Further, such wireless communication systems may additionally include peer-to-peer (e.g., mobile-to-mobile) ad hoc network systems often using unpaired unlicensed spectrums, 802.xx wireless LAN, BLUETOOTH and any other short- or long-range, wireless communication techniques.

Various aspects or features will be presented in terms of systems that may include a number of devices, components, modules, and the like. It is to be understood and appreciated that the various systems may include additional devices, components, modules, etc. and/or may not include all of the devices, components, modules etc. discussed in connection with the figures. A combination of these approaches may also be used.

FIG. 1 illustrates a wireless communication system 100 that facilitates providing shared SR resources. System 100 includes a device 102 that can communicate with a base station 104 to receive wireless network access. For example, device 102 can be a UE, modem (or other tethered device), a portion thereof, or substantially any device that can communicate with one or more base stations or other devices in a wireless network. Base station 104 can be a macrocell, femtocell or picocell base station, a relay node, a mobile base station, a mobile device (e.g., communicating with device 102 in peer-to-peer or ad-hoc mode), a portion thereof, and/or substantially any device that can provide wireless network access to one or more devices.

Device 102 may include an identifier receiving component 106 that obtains one or more identifiers related to utilizing shared SR resources, and a shared SR resource receiving component 108 that obtains an indication of shared SR resources related to at least one of the one or more identifiers. Device 102 may also comprise an SR transmitting component 110 that communicates an SR over the indicated shared SR resources, and an uplink grant receiving component 112 that obtains an uplink grant based at least in part on the SR. Base station 104 can comprise an optional identifier provisioning component 114 that communicates one or more identifiers related to utilizing shared SR resources to a device, and a shared SR configuring component 116 that establishes shared SR resources for the one or more identifiers. Base station 104 can also comprise an SR receiving component 118 that obtains an SR from one or more devices over the shared SR resources, and an uplink grant providing component 120 that allocates an uplink grant to the one or more devices based at least in part on an SR.

According to an example, base station 104 can provide shared SR resources such that one or more devices can utilize the same shared SR resources for transmitting SRs to the base station 104. For example, SR resources can refer to a set of resources over which a device can transmit an SR to the base station 104 to request an uplink grant from the base station 104. The SR resources may relate to one or more portions of frequency over one or more periods of time that are defined for communicating SRs with one or more devices. In this regard, shared SR configuring component 116 can configure shared SR resources for the one or more devices. In one example, shared SR configuring component 116 can configure shared SR resources for each of one or more identifiers related to one or more devices, and shared SR configuring component 116 can similarly communicate an indication of the shared SR resources and the corresponding identifiers to device 102. Thus, SR transmitting component 110 can determine shared SR resources for device 102 based at least in part on locating an identifier related to device 102 in the identifiers for the indicated shared SR resources, and can transmit an SR over the shared SR resources to request an uplink grant from base station 104.

In one example, identifier receiving component 106 can obtain an identifier related to device 102 from base station 104 (e.g., from identifier provisioning component 114). In another example, identifier receiving component 106 can receive an identifier related to device 102 from a hardcoding, network specification, configuration, and/or the like.

Shared SR configuring component 116 may specify shared SR resources and identifiers related to the shared SR resources by signaling in one or more time durations (e.g., every n ms) or portions of a subframe. For example, a subframe can include a collection of orthogonal frequency division multiplexing (OFDM) symbols, and thus the shared SR configuring component 116 can communicate the indications of shared SR resource and corresponding identifiers every n OFDM symbols. In addition, identifier provisioning component 114 may transmit an identifier related to the device 102 as well in one or more time durations, portions of a subframe, etc. In this example, identifier receiving component 106 can obtain the one or more identifiers from base station 104 (e.g., via broadcast or dedicated signaling) from identifier provisioning component 114.

In one example, shared SR configuring component 116 can transmit the indication of shared SR resources to device 102 over layer 3 (L3) (e.g., using radio resource control (RRC) signaling), and shared SR resource receiving component 108 can obtain the indication over the L3 layer in the one or more time durations. This can mitigate overhead caused by transmitting SR resource indications over a control channel (such as physical downlink control channel (PDCCH) in LTE). Moreover, SR receiving component 118 can obtain the SR transmitted by SR transmitting component 110. In addition, uplink grant providing component 120 can allocate uplink transmission resources to device 102 based at least in part on the SR, and can transmit an uplink grant indicating the resources to device 102. Uplink grant receiving component 112 can obtain the uplink grant, and device 102 can begin communicating with base station 104 over the uplink resources. For example, the uplink resources can relate to physical uplink shared channel (PUSCH) resources (e.g., in LTE).

Figure 2:
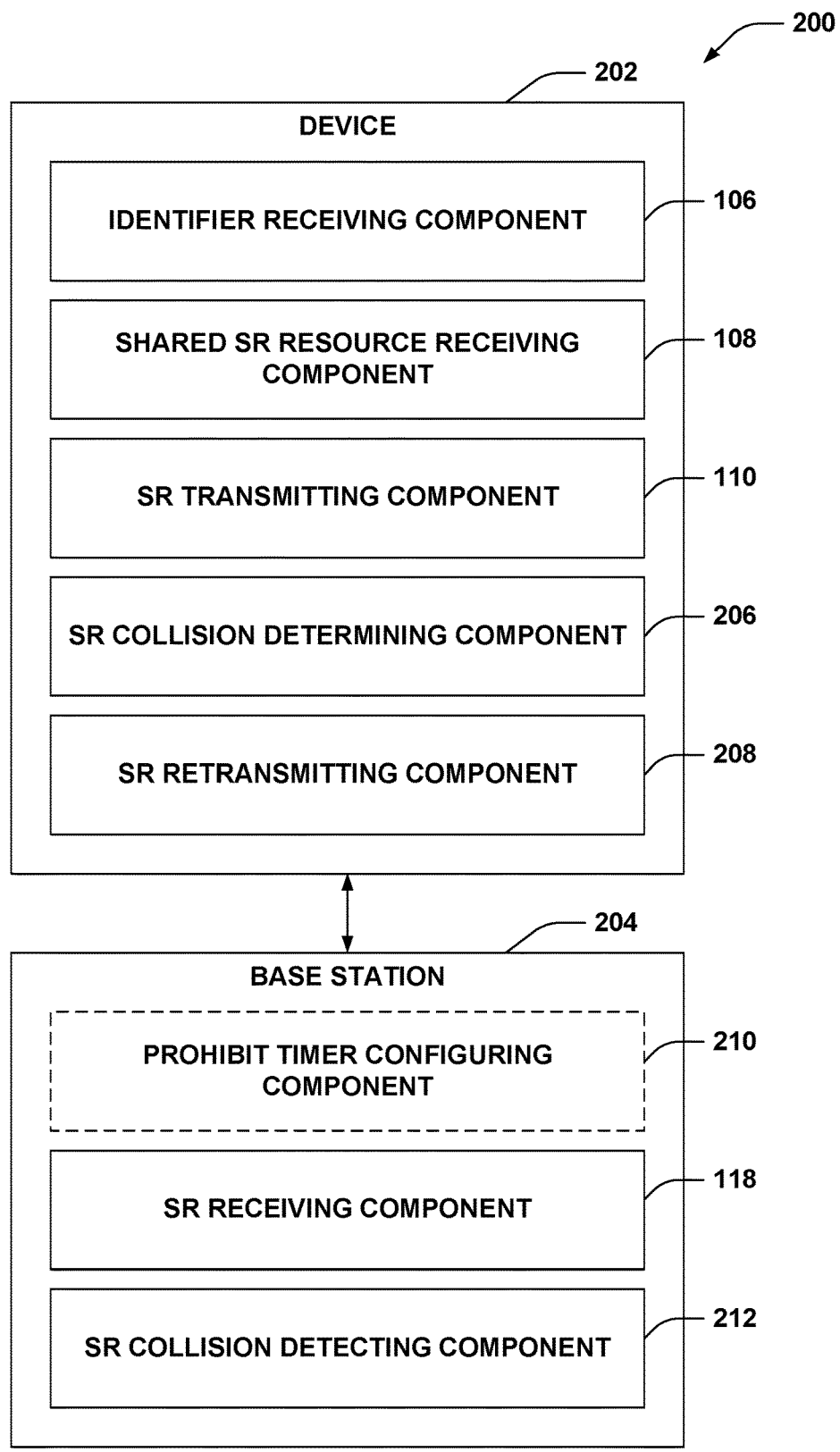
FIG. 2 illustrates an example system for detecting SR collisions over shared SR resources.

FIG. 2 depicts an example device 200 that facilitates handling collisions of SR transmissions over shared SR resources. Device 200 may be a UE, modem, etc. that can communicate with a base station 204 to receive wireless network access. Device 200 can comprise an identifier receiving component 106 that obtains one or more identifiers related to utilizing shared SR resources, a shared SR resource receiving component 108 that obtains an indication of shared SR resources related to at least one of the one or more identifiers, and an SR transmitting component 110 that communicates an SR over the indicated shared SR resources. Moreover, device 200 can comprise an SR collision determining component 206 that detects collision with one or more different devices over shared SR resources, and an SR retransmitting component 208 that retransmits an SR over different shared SR resources to recover from the collision. In addition, base station 204 can include an optional prohibit timer configuring component 210 that can communicate one or more parameters for a prohibit timer to device 202 to resolve communication collisions, an SR receiving component 118 that can obtain an SR over the shared SR resources, and an SR collision detecting component 212 that determines and/or indicates that two or more SRs collide over the shared SR resources.

Identifier receiving component 106 can obtain one or more identifiers from base station 204. These identifiers may be group identifiers that relate to utilizing shared SR resources. Moreover, for example, shared SR resource receiving component 108 can obtain an indication of shared SR resources related to the one or more identifiers from the base station. Device 102 may request an uplink grant to communicate user plane data by utilizing SR transmitting component 110 to transmit a SR over the shared SR resources associated with the identifier (e.g., as specified in the indication of shared SR resources for the identifier) to facilitate receiving an uplink grant.

The shared SR resources may support multiple devices (e.g., where the multiple devices can be grouped by the base station), such that the multiple devices can transmit an SR over the shared SR resources. For example, SR transmitting component 110 can transmit the SR over the shared SR resources, and SR receiving component 118 can obtain the SR over the shared SR resources along with another SR from another device (not shown). SR collision detecting component 212 can determine collision among the SRs as it cannot properly decode the SRs due to interference between the SRs. In one example, SR collision detecting component 212 can indicate collision to device 202 by at least one of requesting retransmission of the SR from device 202 (e.g., and the other device), transmitting an error to the device 202, and/or the like. For example, requesting retransmission can be performed by transmitting a non-acknowledgement over a retransmission indicator channel (e.g., physical hybrid automatic repeat/request (HARD) indicator channel (PHICH) in LTE) for the shared SR resources.

SR collision determining component 206 can detect a collision with the one or more additional devices. In one example, SR collision determining component 206 can detect the collision based at least in part on at least one of receiving an error from the base station 204 for the SR transmission, not receiving an uplink grant from the base station after a specified period of time, receiving an explicit indication of collision from the base station 204, receiving a retransmission request from the base station 204 related to the SR, and/or the like. SR retransmitting component 208 may retransmit the SR in an attempt to recover from the collision. SR retransmitting component 208 may retransmit the SR over different shared SR resources in a different subframe to minimize that chance of another collision. Furthermore, SR retransmitting component 208 may select the different shared SR resources randomly, pseudo-randomly (e.g., based at least in part on an identifier of device 202), according to a configuration, hardcoding, network specification, and/or the like.

SR retransmitting component 208 may also employ a prohibit timer to block the retransmission for a period of time to prevent immediate collision with the same additional device, for example. For example, SR retransmitting component 208 can utilize a prohibit timer that is already configured in device 200 (e.g., to handle other device collisions). The prohibit timer configuring component 210 may configure the prohibit timer, and may configure different prohibit timers for devices that share the same shared SR resources (e.g., devices that are in the same group). This can include configuring values to be used in initializing the timers. Thus, in this example, prohibit timer configuring component 210 can communicate at least a prohibit timer duration to device 202, and SR retransmitting component 208 can utilize a prohibit timer with the received duration to differ shared SR resources utilized to retransmit the SR. For example, SR retransmitting component 208 may select resources for retransmitting the SR based at least in part on the prohibit timer (e.g., selects resources that occur after expiration of the timer, selects resources after determining expiration of the timer, etc.). In yet another example, SR retransmitting component 208 can utilize a random prohibit timer that performs a random backoff if no uplink grant is received from one or more SR retransmissions by SR retransmitting component 208. SR retransmitting component 208 can retransmit the SR according to the prohibit timer. For example, this can include SR retransmitting component 208 initializing the prohibit timer upon determining that the previous SR transmission (or retransmission) collides with another device or is otherwise not received, and retransmitting the SR upon expiration of the prohibit timer.

Figure 3:
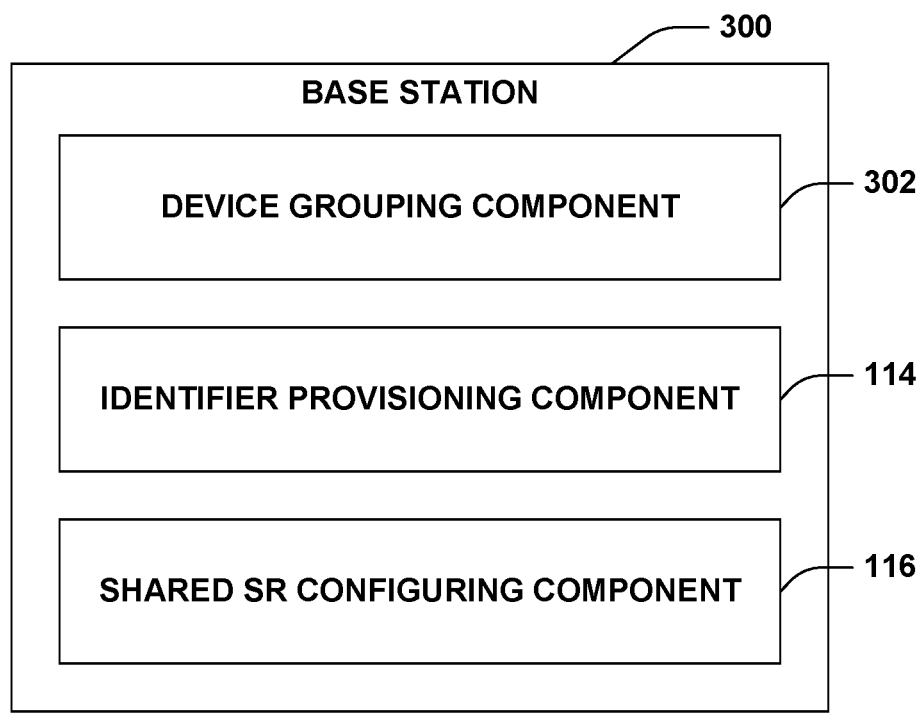
FIG. 3 illustrates an example base station for defining groups of devices for associating with shared SR resources.

FIG. 3 illustrates an example base station 300 that facilitates providing shared SR resources to one or more devices. Base station 300 may provide wireless network access to one or more devices in a wireless network. Base station 300 can comprise a device grouping component 302 for associating one or more devices in a group for providing shared SR resources to the group of devices, an identifier provisioning component 114 that communicates one or more group identifiers related to utilizing shared SR resources to a device, and a shared SR configuring component 116 that establishes shared SR resources for the one or more group identifiers.

Device grouping component 302 may associate one or more devices, to which it assigns shared SR resources, in a group according to one or more similar properties of the one or more devices. For example, the one or more similar properties can correspond to channel conditions between base station 300 and the devices (e.g., as determined by base station 300 based at least in part on reported channel conditions from device, measured quality of signals from the device, etc.), QoS requirements of the devices (e.g., received from the device, etc.), types of the devices or related network interfaces, and/or the like. In one example, device grouping component 302 can group devices with similar channel conditions, similar QoS requirements, etc.

Identifier provisioning component 114 may communicate one or more identifiers available to a group associated with a device to the device, and shared SR configuring component 116 can provision indications of shared SR resources for the one or more identifiers to the device. In addition, the device can determine which shared SR resources to utilize based at least in part on matching at least one of the received group identifiers with an identifier of at least one of the one or more shared SR resources. Moreover, in an example, device grouping component 302 can utilize contention-based group identifiers, such as contention-based radio network temporary identifiers (CB-RNTI). In addition, periodicity of shared SR configuring component 116 transmitting shared SR resource indications can be defined per each group of UEs, as can SR power control, which can also be specified in the shared SR resource indication.

Figure 4:
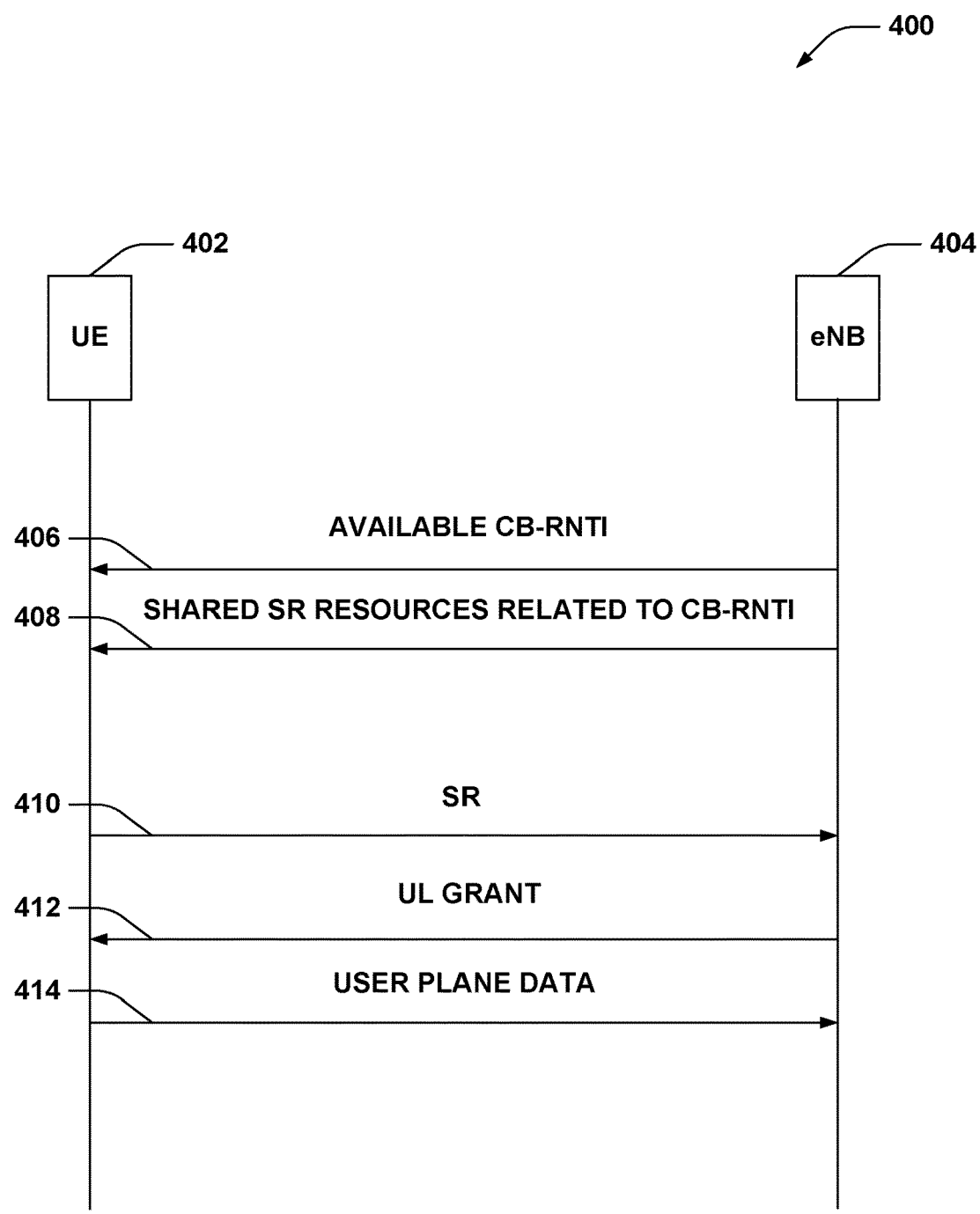
FIG. 4 illustrates communications in an example system that facilitates communicating SRs over shared SR resources.

FIG. 4 illustrates communications within an example wireless communications system 400 that facilitates providing shared SR resources to one or more devices. System 400 includes a UE 402 that communicates with an eNB 404 to receive access to a wireless network. While FIG. 4 illustrates example wireless communications system 400 with a single UE 402, the example wireless communications system 400 is intended to operate with any number of UEs, with UE 402 being exemplary of a UE in the system 400.

To allow UE 402 to transmit SRs over shared SR resources, eNB 404 can notify UE 402 of available CB-RNTIs 406. This can include grouping the UE 402 with other UEs (e.g., having similar channel conditions, QoS requirements, etc.) and communicating CB-RNTIs related to the group. In this regard, eNB 404 may communicate the CB-RNTIs to one or more other UEs in the group as well. In addition, eNB 404 can communicate an indication of shared SR resources related to the CB-RNTIs 408. Thus, when UE 402 requests uplink resources, it can transmit an SR 410 to eNB 404 over a shared SR resource related to one or more of the CB-RNTIs. In this regard, for example, UE 402 can select a CB-RNTI from the one or more CB-RNTIs received. eNB 404 can provide an uplink grant 412 to UE 402 based at least in part on the SR, and UE 402 can transmit user plane data 414 to eNB 404 over the uplink.

Figure 5:
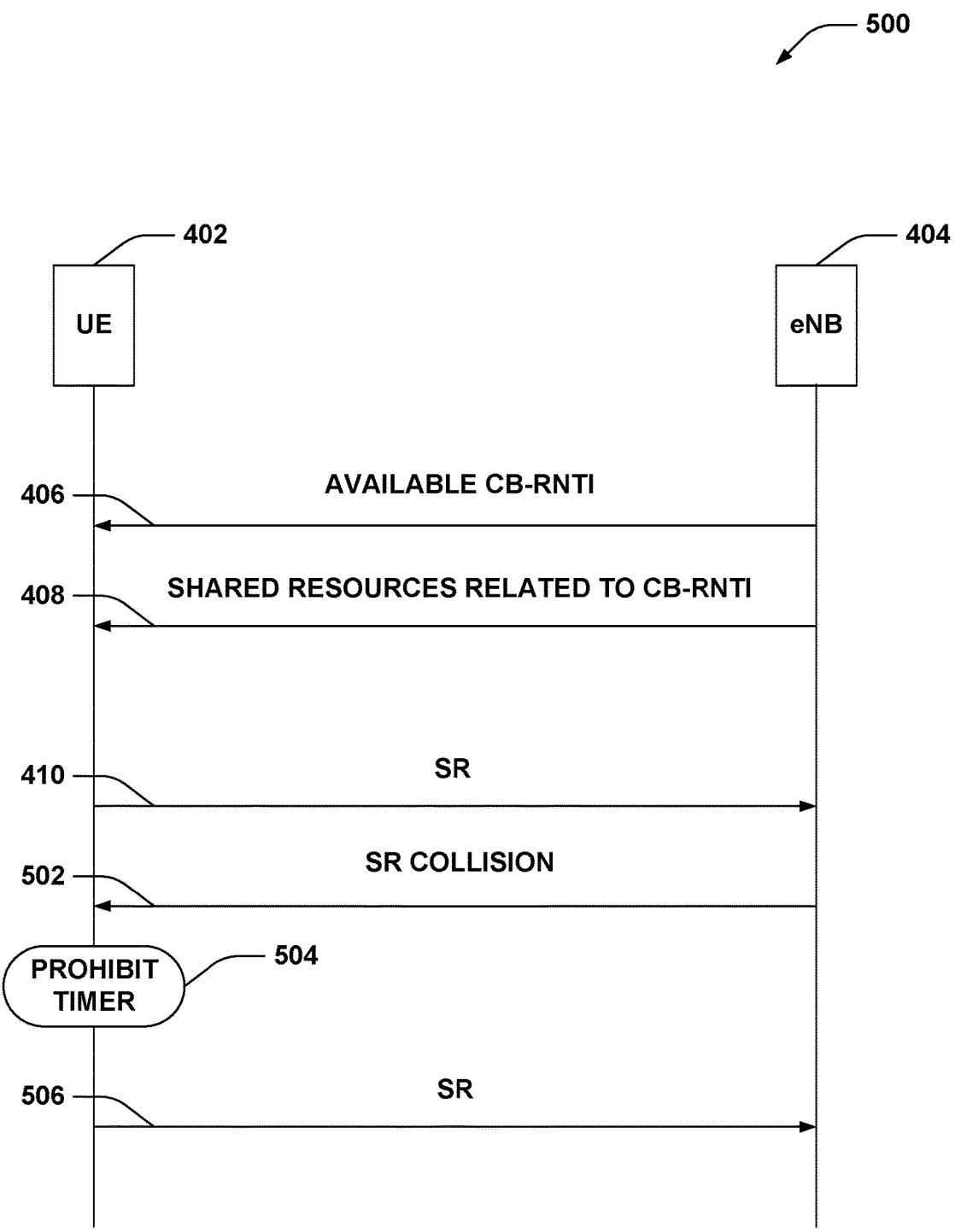
FIG. 5 illustrates communications in an example system that handles SR collisions over shared SR resources.

FIG. 5 illustrates communications within an example wireless communications system 500 that facilitates resolving collisions in providing shared SR resources to one or more devices. System 500 includes a UE 402 that communicates with an eNB 404 to receive access to a wireless network. Similarly, while FIG. 5 illustrates example wireless communications system 500 with a single UE 402, the example wireless communications system 500 is intended to operate with any number of UEs, with UE 402 being exemplary of a UE in the system 500.

To allow UE 402 to transmit SRs over shared SR resources, eNB 404 can notify UE 402 of available CB-RNTIs 406. This may include grouping the UE 402 with other UEs (e.g., having similar channel conditions, QoS requirements, etc.) and communicating CB-RNTIs related to the group. The eNB 404 may communicate the CB-RNTIs to one or more other UEs in the group. In addition, eNB 404 can communicate an indication of shared SR resources related to the CB-RNTIs 408. Thus, when UE 402 requests uplink resources, UE 402 can transmit an SR 410 to eNB 404 over a shared SR resource related to one or more of the CB-RNTIs. Accordingly, in this example, UE 402 can select a CB-RNTI from the one or more CB-RNTIs received. Since the SR resources can be shared among multiple UEs, SR 410 can collide with one or more SRs from other UEs.

eNB 404 may notify UE 402 of the SR collision 502 (e.g., via explicit indication, error, retransmission request, and/or the like). UE 402 can initialize a prohibit timer 504 based at least in part on the SR collision. Following expiration of prohibit timer 504, UE 402 can retransmit the SR 506 to eNB 404. Accordingly, the SR retransmission 506 can succeed or fail; in the latter case, UE 402 can again initialize the prohibit timer 504 and attempt retransmission of the SR 506. Moreover, UE 402 can utilize a preconfigured prohibit timer, receive a configured prohibit timer value from eNB 404 (e.g., which can be based at least in part on a grouping of UE 402), utilize a random backoff timer that decreases with each failed retransmission of the SR 506, and/or the like.

FIGS. 6-9 illustrate example methodologies relating to communicating over shared SR resources. While, for purposes of simplicity of explanation, the methodologies are shown and described as a series of acts, it is to be understood and appreciated that the methodologies are not limited by the order of acts, as some acts may, in accordance with one or more embodiments, occur in different orders and/or concurrently with other acts from that shown and described herein. For example, it is to be appreciated that a methodology could alternatively be represented as a series of interrelated states or events, such as in a state diagram. Moreover, not all illustrated acts may be required to implement a methodology in accordance with one or more embodiments.

Figure 6:
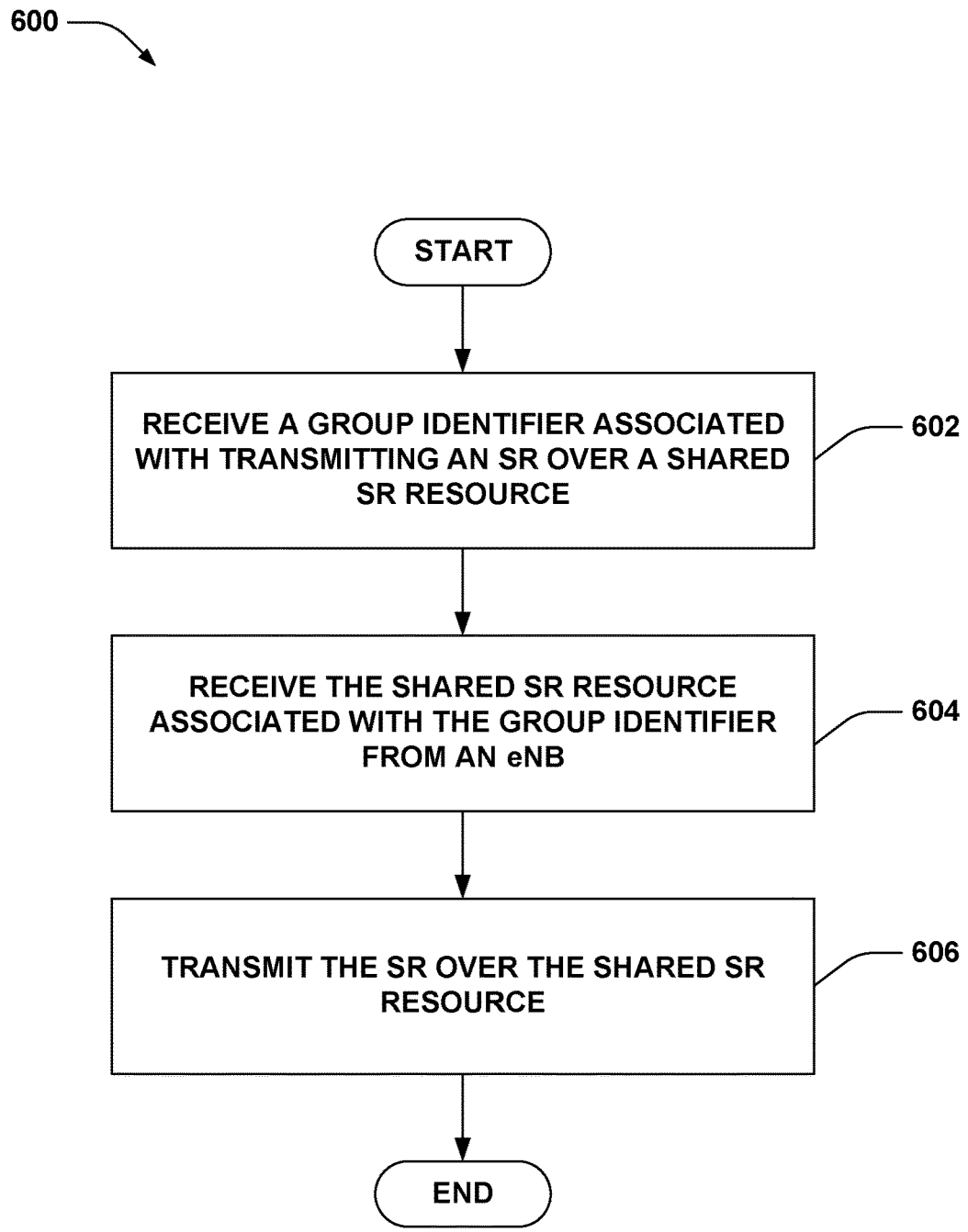
FIG. 6 illustrates an example methodology that utilizes shared SR resources to transmit an SR.

FIG. 6 illustrates an example methodology 600 that facilitates utilizing shared SR resources for transmitting an SR. At 602, a group identifier associated with transmitting an SR over a shared SR resource can be received. The group identifier can relate to a group of UEs that have at least one similar property, such as QoS, channel conditions, device type, network interface, and/or the like. Moreover, the group identifier can be received from an eNB (e.g., along with an indication of shared SR resources, upon connecting to the base station, upon connecting to a wireless network, etc.), from a hardcoding, network specification, or configuration, and/or the like. At 604, the shared SR resource associated with the group identifier can be received from the eNB. For example, the shared SR resource (e.g., and/or the group identifier) can be received from the eNB, over L3 signaling or otherwise, during time durations, such as every n ms, or other portions of subframes; additionally or alternatively, the shared SR resource can be persistent. At 606, the SR can be transmitted over the shared SR resource. This can be to acquire an uplink grant.

Figure 7:
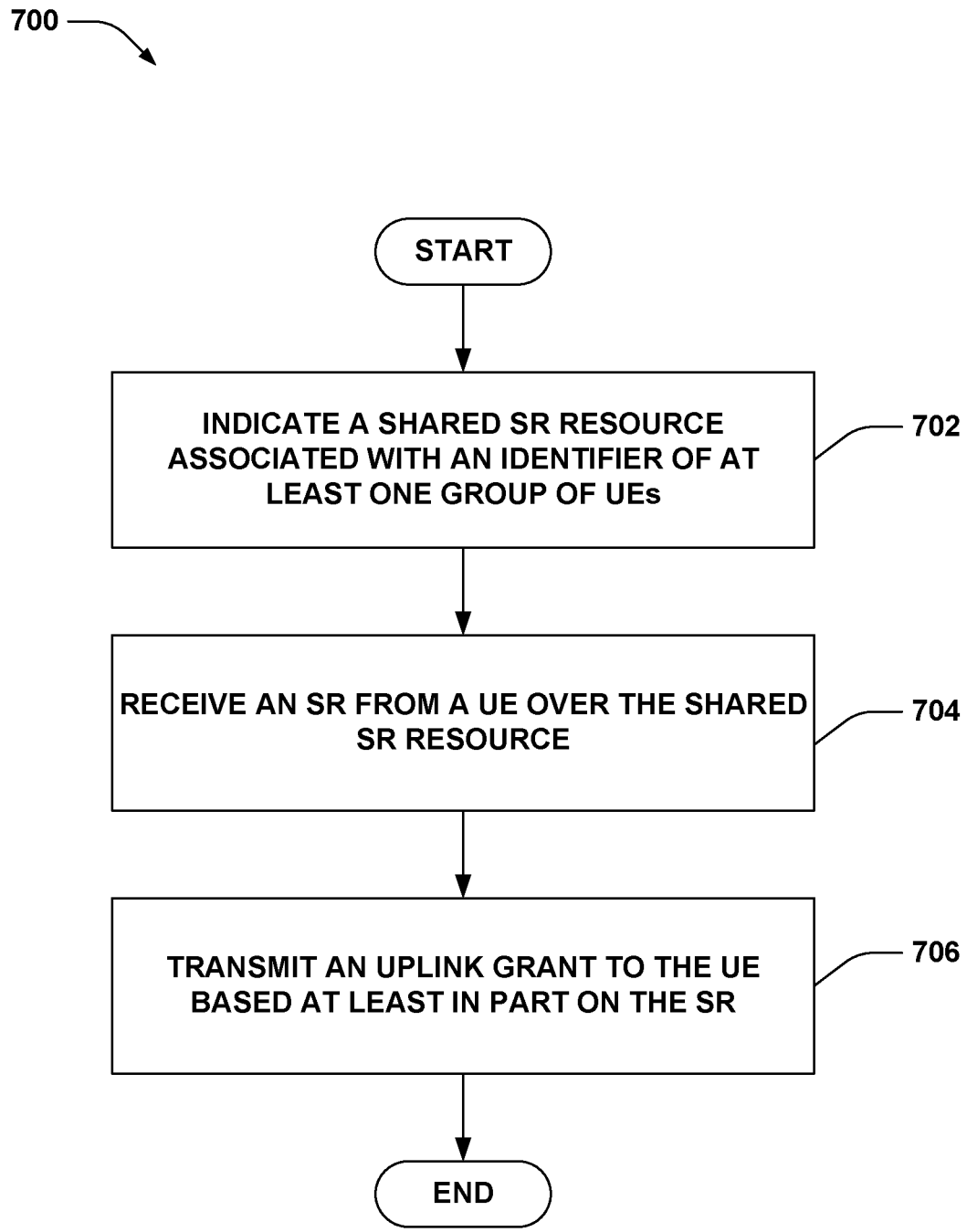
FIG. 7 illustrates an example methodology that provides shared SR resources.

FIG. 7 illustrates an example methodology 700 that facilitates receiving an SR over shared SR resources. At 702, a shared SR resource associated with a group identifier of at least one group of UEs can be indicated. For example, this can include signaling the shared SR resources and an associated group identifier to one or more devices (e.g., over L3 signaling). In addition, UEs can be grouped according to at least one similar property, and the identifier can be associated with one such group. At 704, an SR can be received from a UE over the shared SR resource. At 706, an uplink grant can be transmitted to the UE based at least in part on the SR.

Figure 8:
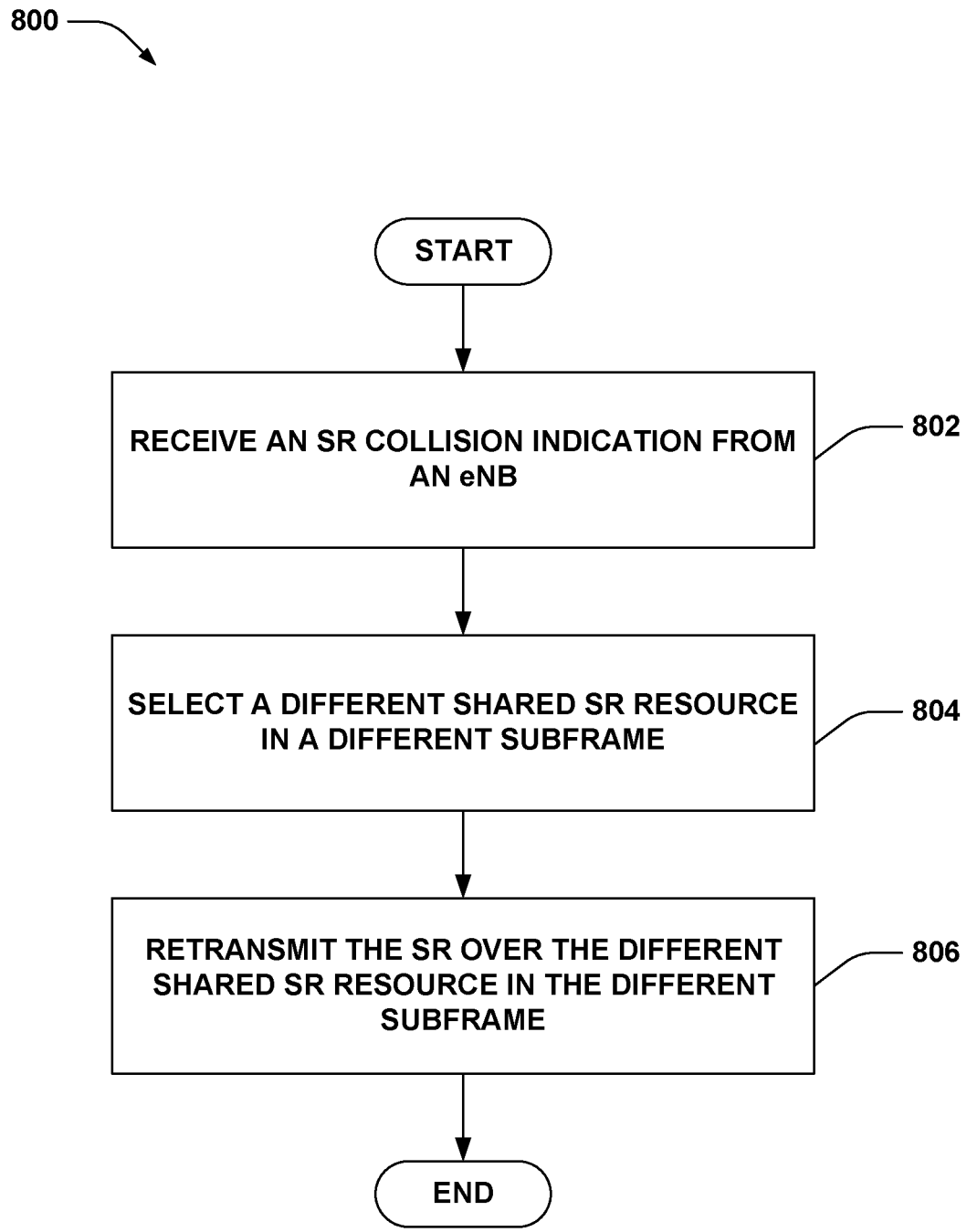
FIG. 8 illustrates an example methodology for retransmitting SRs over different shared SR resources upon collision.

FIG. 8 illustrates an example methodology 800 for retransmitting an SR upon determining collision of a previous SR. At 802, an SR collision indication can be received from an eNB. Since the SR resources are shared, SRs related to a single group identifier can collide over the shared SR resources. At 804, a different shared SR resource in a different subframe can be selected. For example, this can include selecting the different shared SR resources to be in a different relative portion of the different subframe than in a previous subframe. For example, a prohibit timer can be utilized to determine when to retransmit the SR over shared SR resources. In another example, selecting a different portion of the different subframe can be done randomly, pseudo-randomly, according to a hardcoding, network specification, or configuration, and/or the like. At 806, the SR can be retransmitted over the different shared SR resource in the different subframe.

Figure 9:
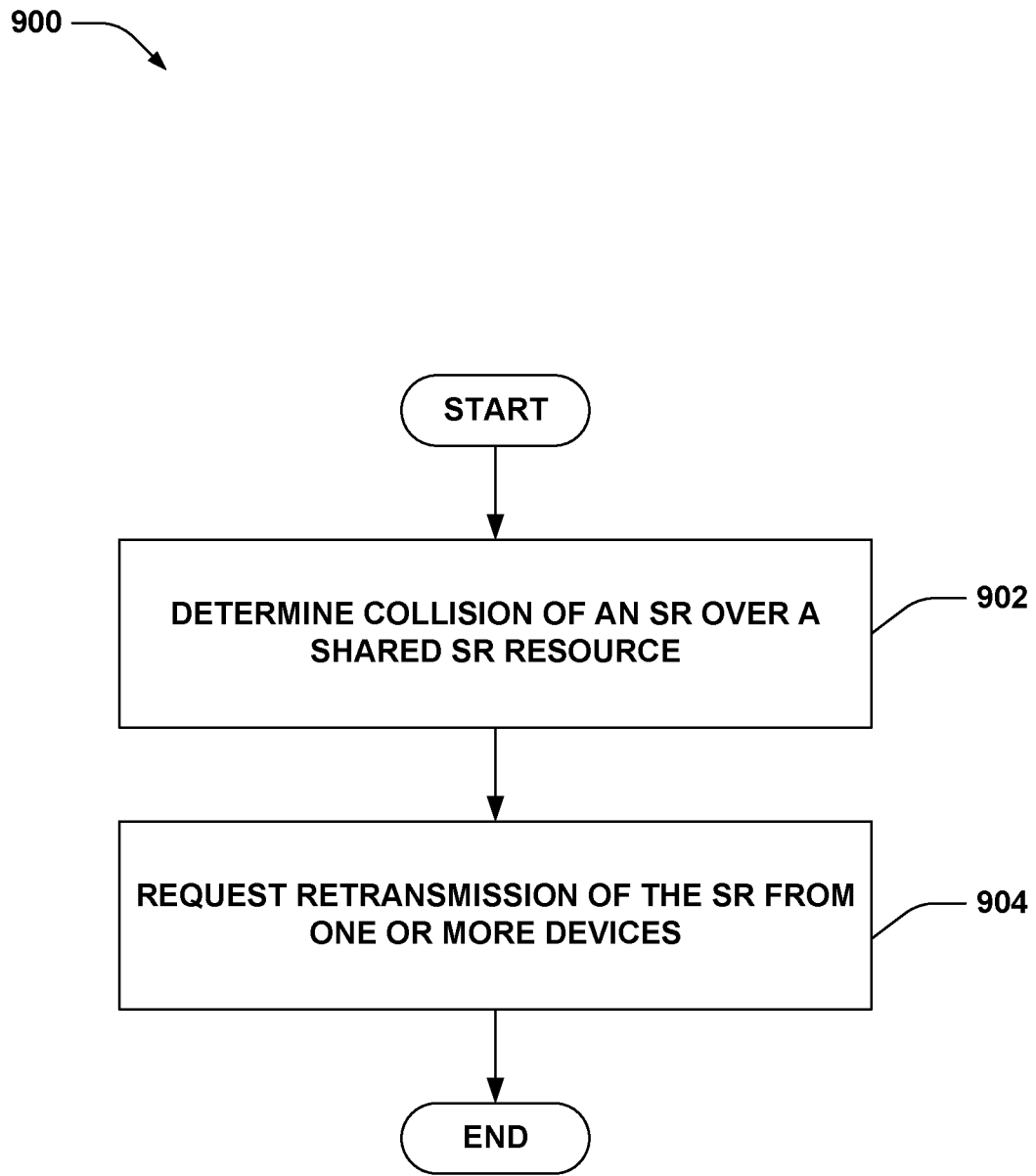
FIG. 9 illustrates an example methodology that facilitates detecting SR collision over shared SR resources.

FIG. 9 illustrates an example methodology 900 that facilitates detecting SR collision over shared SR resources. At 902, collision of an SR over shared SR resources can be determined. For example, this can include determining that the SR cannot be decoded due to interference. At 904, retransmission of the SR can be requested from the one or more devices.

In accordance with one or more aspects described herein, inferences can be made regarding determining group identifiers for a group of UEs, detecting SR collision, and/or the like, as described. The term to "infer" or "inference" refers generally to the process of reasoning about or inferring states of the system, environment, and/or user from a set of observations as captured via events and/or data. Inference can be employed to identify a specific context or action, or can generate a probability distribution over states, for example. The inference can be probabilistic—that is, the computation of a probability distribution over states of interest based on a consideration of data and events. Inference can also refer to techniques employed for composing higher-level events from a set of events and/or data. Such inference results in the construction of new events or actions from a set of observed events and/or stored event data, whether or not the events are correlated in close temporal proximity, and whether the events and data come from one or several event and data sources.

Figure 10:
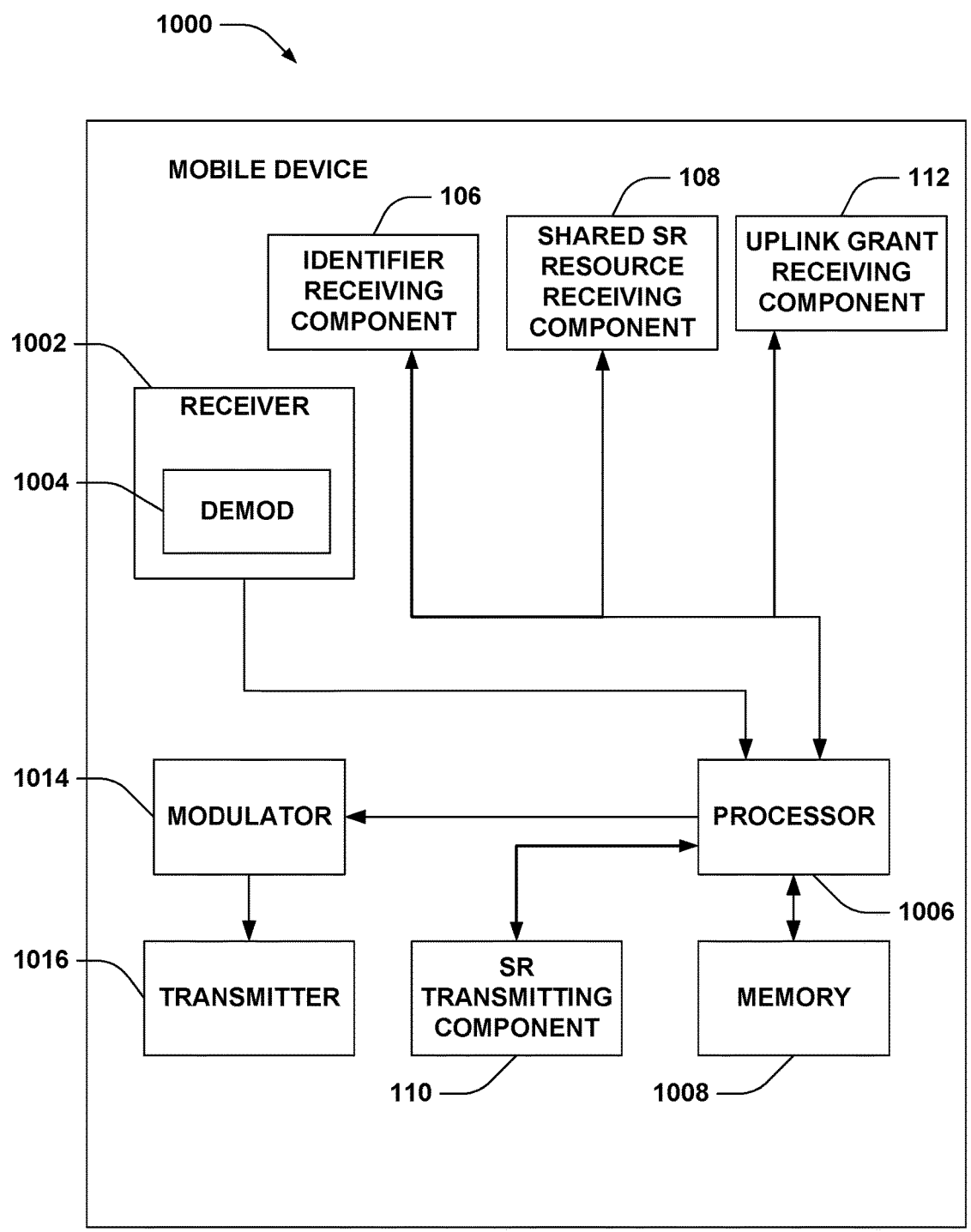
FIG. 10 illustrates an example mobile device that facilitates utilizing shared SR resources.

FIG. 10 illustrates a mobile device 1000 that facilitates utilizing shared SR resources to transmit SRs to one or more base stations. Mobile device 1000 may include a receiver 1002 that receives a signal from, for instance, a receive antenna (not shown), performs typical actions on (e.g., filters, amplifies, downconverts, etc.) the received signal, and digitizes the conditioned signal to obtain samples. Receiver 1002 may include a demodulator 1004 that can demodulate received symbols and provide them to a processor 1006 for channel estimation. Processor 1006 can be a processor dedicated to analyzing information received by receiver 1002 and/or generating information for transmission by a transmitter 1016, a processor that controls one or more components of mobile device 1000, and/or a processor that both analyzes information received by receiver 1002, generates information for transmission by transmitter 1016, and controls one or more components of mobile device 1000.

Mobile device 1000 may additionally include memory 1008 that is operatively coupled to processor 1006 and that can store data to be transmitted, received data, information related to available channels, data associated with analyzed signal and/or interference strength, information related to an assigned channel, power, rate, or the like, and any other suitable information for estimating a channel and communicating via the channel. Memory 1008 can additionally store protocols and/or algorithms associated with estimating and/or utilizing a channel (e.g., performance based, capacity based, etc.).

It will be appreciated that the data store (e.g., memory 1008) described herein can be either volatile memory or nonvolatile memory, or can include both volatile and nonvolatile memory. By way of illustration, and not limitation, nonvolatile memory can include read only memory (ROM), programmable ROM (PROM), electrically programmable ROM (EPROM), electrically erasable PROM (EEPROM), or flash memory. Volatile memory can include random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). The memory 1008 of the subject systems and methods is intended to comprise, without being limited to, these and any other suitable types of memory.

Processor 1006 can further be operatively coupled to an identifier receiving component 106 for obtaining an identifier related to mobile device 1000, a shared SR resource receiving component 108 that obtains an indication of shared SR resources for communicating an SR, an SR transmitting component 110 that communicates the SR over shared SR resources based at least in part on the identifier, and an uplink grant receiving component 112 that obtains an uplink grant based at least in part on the SR. For example, receiver 1002 can obtain signals from a base station or other device and provide the signals to processor 1006, and identifier receiving component 106 can determine the signal relates to an identifier for mobile device 1000. In another example, identifier receiving component 106 can determine an identifier from a hardcoding, network specification, configuration, and/or the like. Thus, for example, identifier receiving component 106 can store the identifier in memory 1008, in one example. Similarly, shared SR resource receiving component 108 can determine whether one or more signals relate to an indication of shared SR resources and related device identifiers.

Shared SR resource receiving component 108 can similarly store shared SR resource locations and related identifiers in memory 1008, for example. In this regard, SR transmitting component 110 can determine shared SR resources from memory 1008 that correspond to the identifier stored in memory 1008 and can transmit an SR over the shared SR resources (e.g., via processor 1006). In this regard, uplink grant receiving component 112 can determine whether subsequently received signals include an uplink grant related to the SR, and if so, can store an indication of the uplink grant in memory 1008 for use in transmitting signals to the base station. Mobile device 1000 still further comprises a modulator 1014 and transmitter 1016 that respectively modulate and transmit signals to, for instance, a base station, another mobile device, etc. Although depicted as being separate from the processor 1006, it is to be appreciated that the identifier receiving component 106, shared SR resource receiving component 108, SR transmitting component 110, uplink grant receiving component 112, demodulator 1004, and/or modulator 1014 can be part of the processor 1006 or multiple processors (not shown).

Figure 11:
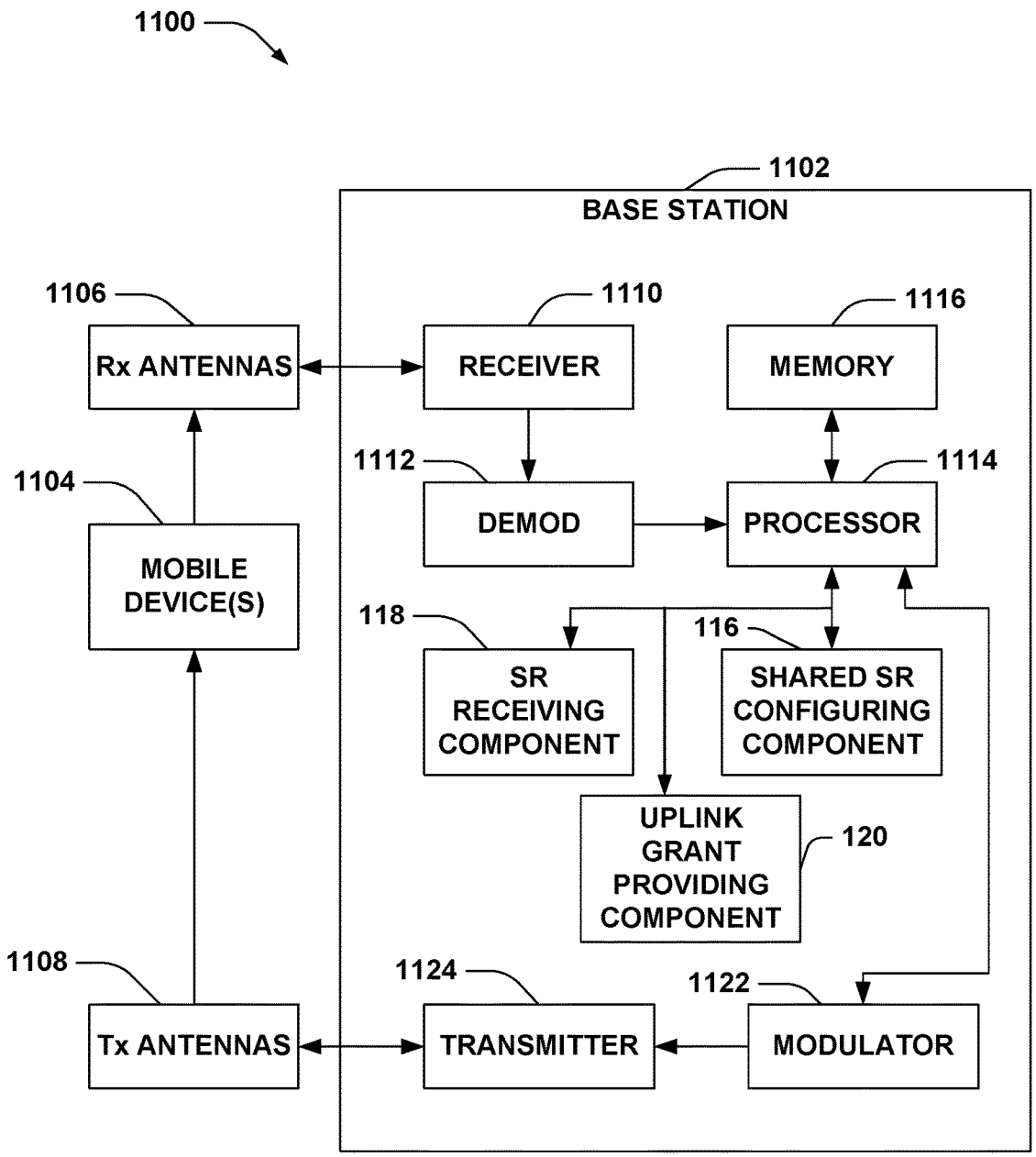
FIG. 11 illustrates an example system that facilitates providing shared SR resources.

FIG. 11 illustrates an example system 1100 that facilitates providing shared SR resources for receiving SRs from one or more mobile devices. System 1100 comprises a base station 1102, which can be substantially any base station (e.g., femtocell, picocell, macrocell, etc., relay node, mobile base station . . . ) having a receiver 1110 that receives signal(s) from one or more mobile devices 1104 through a plurality of receive antennas 1106, and a transmitter 1124 that transmits to the one or more mobile devices 1104 through a transmit antenna 1108. Receiver 1110 can receive information from receive antennas 1106 and is operatively associated with a demodulator 1112 that demodulates received information. Demodulated symbols are analyzed by a processor 1114 that can be similar to the processor described above with regard to FIG. 10, and which is coupled to a memory 1116 that stores information related to estimating a signal (e.g., pilot) strength and/or interference strength, data to be transmitted to or received from mobile device(s) 1104 (or a disparate base station (not shown)), and/or any other suitable information related to performing the various actions and functions set forth herein. Processor 1114 is further coupled to a shared SR configuring component 116, an SR receiving component 118, and an uplink grant providing component 120.

According to an example, shared SR configuring component 116 can define sets of shared SR resources related to device identifiers (e.g., which can be group identifiers) and transmit L3 signals that indicate the sets of shared SR resources and related device identifiers to mobile devices 1104 via processor 1114. Moreover, SR receiving component 118 can determine whether one or more signals received by receiver 1110 and provided to processor 1114 is an SR received over the shared SR resources. If so, for example, uplink grant providing component 120 can allocate an uplink grant to a related mobile device, and transmit a notification of the grant to the mobile device via processor 1114. For example, processor 1114 can modulate signals to be transmits using modulator 1122, and transmit modulated signals using transmitter 1124. Transmitter 1124 can transmit signals to mobile devices 1104 over Tx antennas 1108. Furthermore, although depicted as being separate from the processor 1114, it is to be appreciated that the shared SH configuring component 116, SR receiving component 118, uplink grant providing component 120, demodulator 1112, and/or modulator 1122 can be part of the processor 1114 or multiple processors (not shown).

Figure 12:
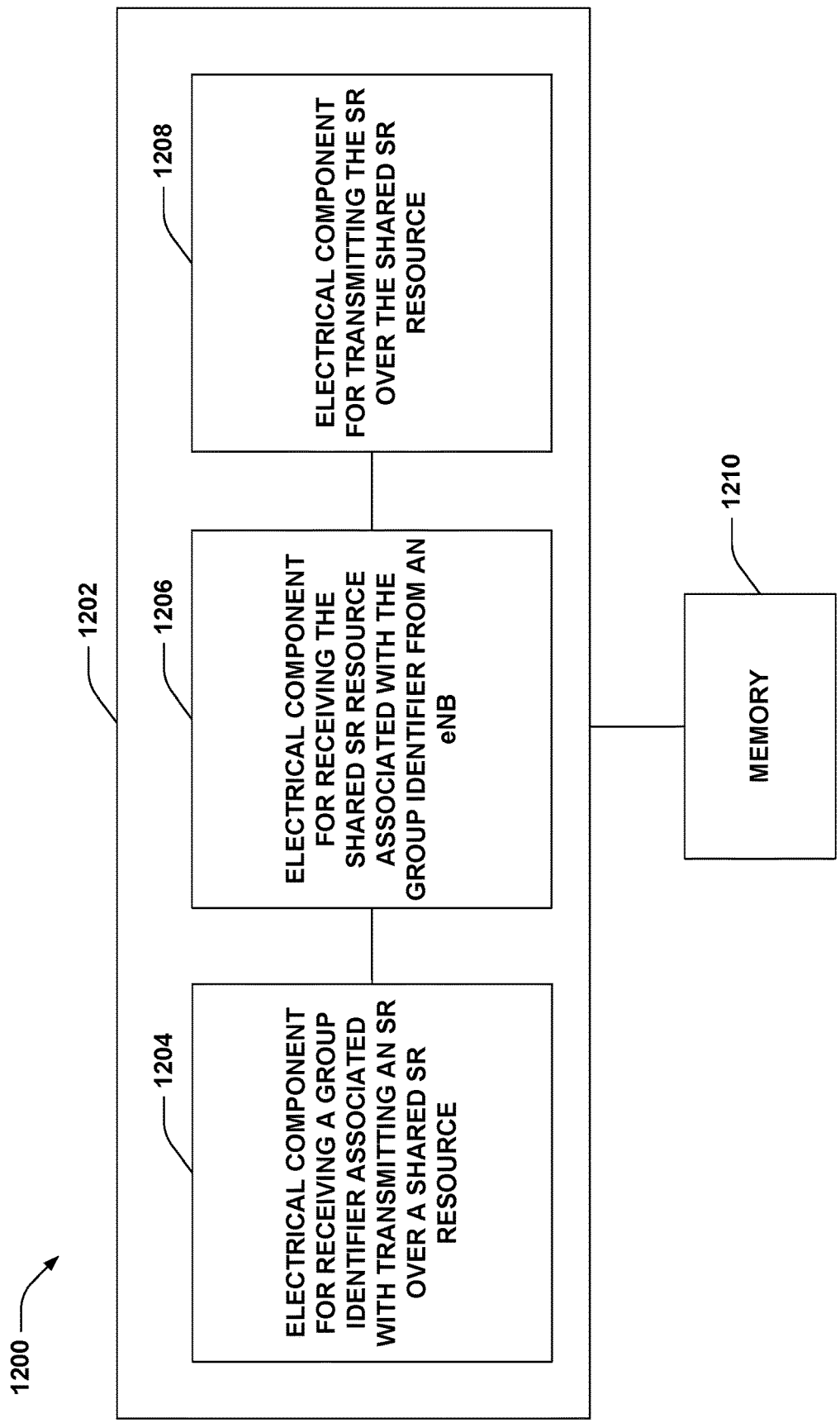
FIG. 12 illustrates an example system for utilizing shared SR resources to transmit an SR.

FIG. 12 illustrates an example system 1200 that communicates SRs over shared SR resources. For example, system 1200 can reside at least partially within a base station, mobile device, etc. It is to be appreciated that system 1200 is represented as including functional blocks, which can be functional blocks that represent functions implemented by a processor, software, or combination thereof (e.g., firmware). System 1200 includes a logical grouping 1202 of electrical components that can act in conjunction. For instance, logical grouping 1202 can include an electrical component for receiving a group identifier associated with transmitting an SR over a shared SR resource 1204. The group identifier can be obtained from an eNB, a hardcoding, network specification, or configuration, etc., and can correspond to a group of UEs with at least one similar property. Further, logical grouping 1202 can comprise an electrical component for receiving the shared SR resource associated with the group identifier from an eNB 1206.

In one example, the shared SR resource (e.g., and/or the group identifier) can be received at given time durations (e.g., every n ms), such to mitigate high wait times associated with acquiring SR resources. Moreover, the shared SR resources, or an indication thereof, can be received over L3 signaling from the eNB, in one example. Furthermore, logical grouping 1202 can comprise an electrical component for transmitting the SR over the shared SR resource 1208. For example, in an aspect, electrical component 1204 can include an identifier receiving component 106. In addition, for example, electrical component 1206, in an aspect, can include a shared SR resource receiving component 108. Moreover, in an example, electrical component 1208, in an aspect, can include an SR transmitting component 110. Additionally, system 1200 can include a memory 1210 that retains instructions for executing functions associated with the electrical components 1204, 1206, and 1208. While shown as being external to memory 1210, it is to be understood that one or more of the electrical components 1204, 1206, and 1208 can exist within memory 1210.

In one example, electrical components 1204, 1206, and 1208 can comprise at least one processor, or each electrical component 1204, 1206, or 1208 can be a corresponding module of at least one processor. Moreover, in an additional or alternative example, electrical components 1204, 1206, and 1208 can be a computer program product comprising a computer readable medium, where each electrical component 1204, 1206, or 1208 can be corresponding code.

Figure 13:
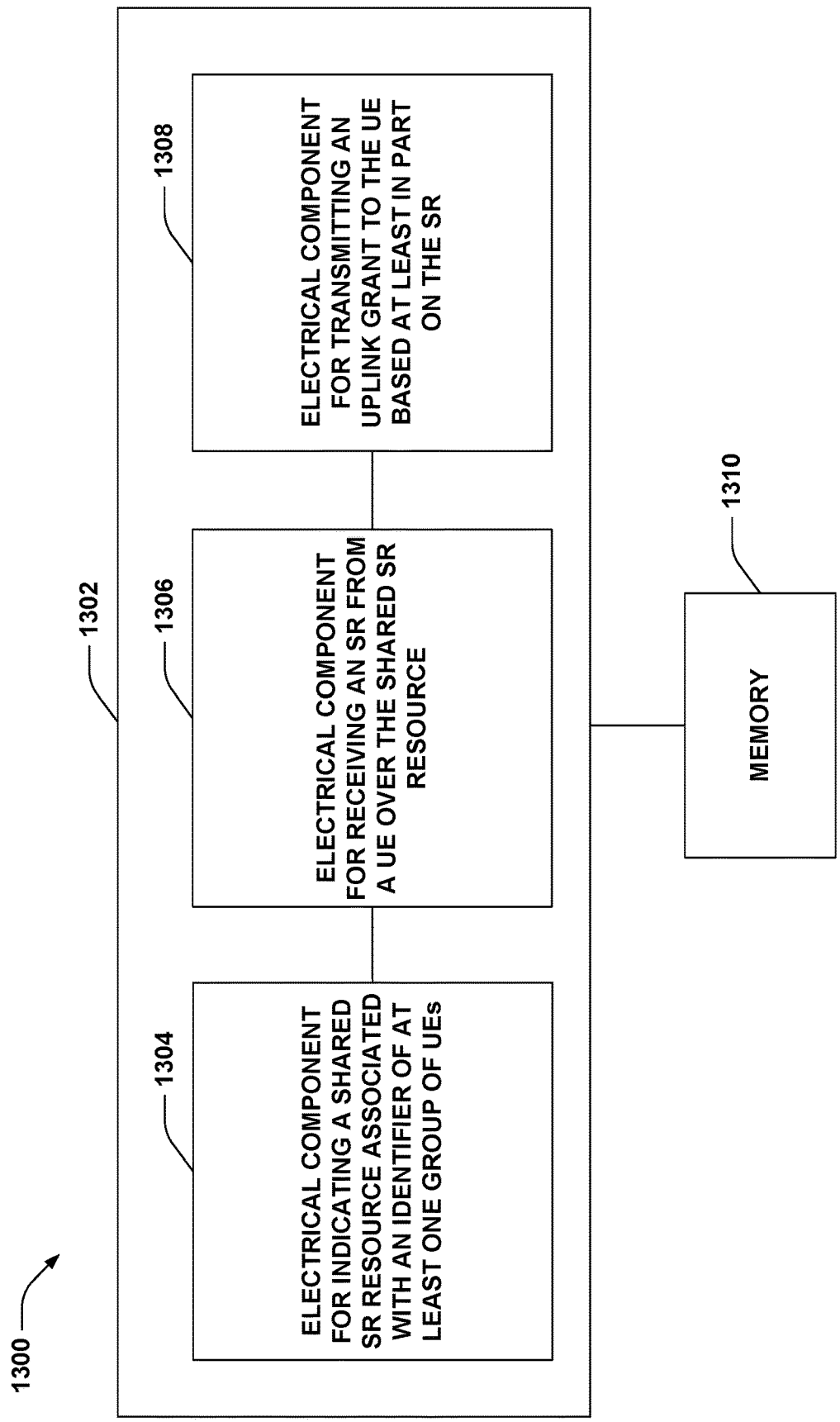
FIG. 13 illustrates an example system for providing shared SR resources.

FIG. 13 illustrates an example system 1300 that provides shared SR resources. For example, system 1300 can reside at least partially within a base station, mobile device, etc. It is to be appreciated that system 1300 is represented as including functional blocks, which can be functional blocks that represent functions implemented by a processor, software, or combination thereof (e.g., firmware). System 1300 includes a logical grouping 1302 of electrical components that can act in conjunction. For instance, logical grouping 1302 can include an electrical component for indicating a shared SR resource associated with an identifier of at least one group of UEs 1304. This can include signaling such indications according to a given time duration. Further, logical grouping 1302 can comprise an electrical component for receiving an SR from a UE over the shared SR resource 1306.

For example, this can include signaling the shared SR resources over L3 signaling. Furthermore, logical grouping 1302 can include an electrical component for transmitting an uplink grant to the UE based at least in part on the SR 1308. The UE can subsequently utilize the uplink grant to transmit signals to system 1300. For example, in an aspect, electrical component 1304 can include a shared SR configuring component 116. In addition, for example, electrical component 1306, in an aspect, can include an SR receiving component 118. Moreover, in an example, electrical component 1308, in an aspect, can include an uplink grant providing component 120. Additionally, system 1300 can include a memory 1310 that retains instructions for executing functions associated with the electrical components 1304, 1306, and 1308. While shown as being external to memory 1310, it is to be understood that one or more of the electrical components 1304, 1306, and 1308 can exist within memory 1310.

In one example, electrical components 1304, 1306, and 1308 can comprise at least one processor, or each electrical component 1304, 1306, or 1308 can be a corresponding module of at least one processor. Moreover, in an additional or alternative example, electrical components 1304, 1306, and 1308 can be a computer program product comprising a computer readable medium, where each electrical component 1304, 1306, or 1308 can be corresponding code.

Figure 14:
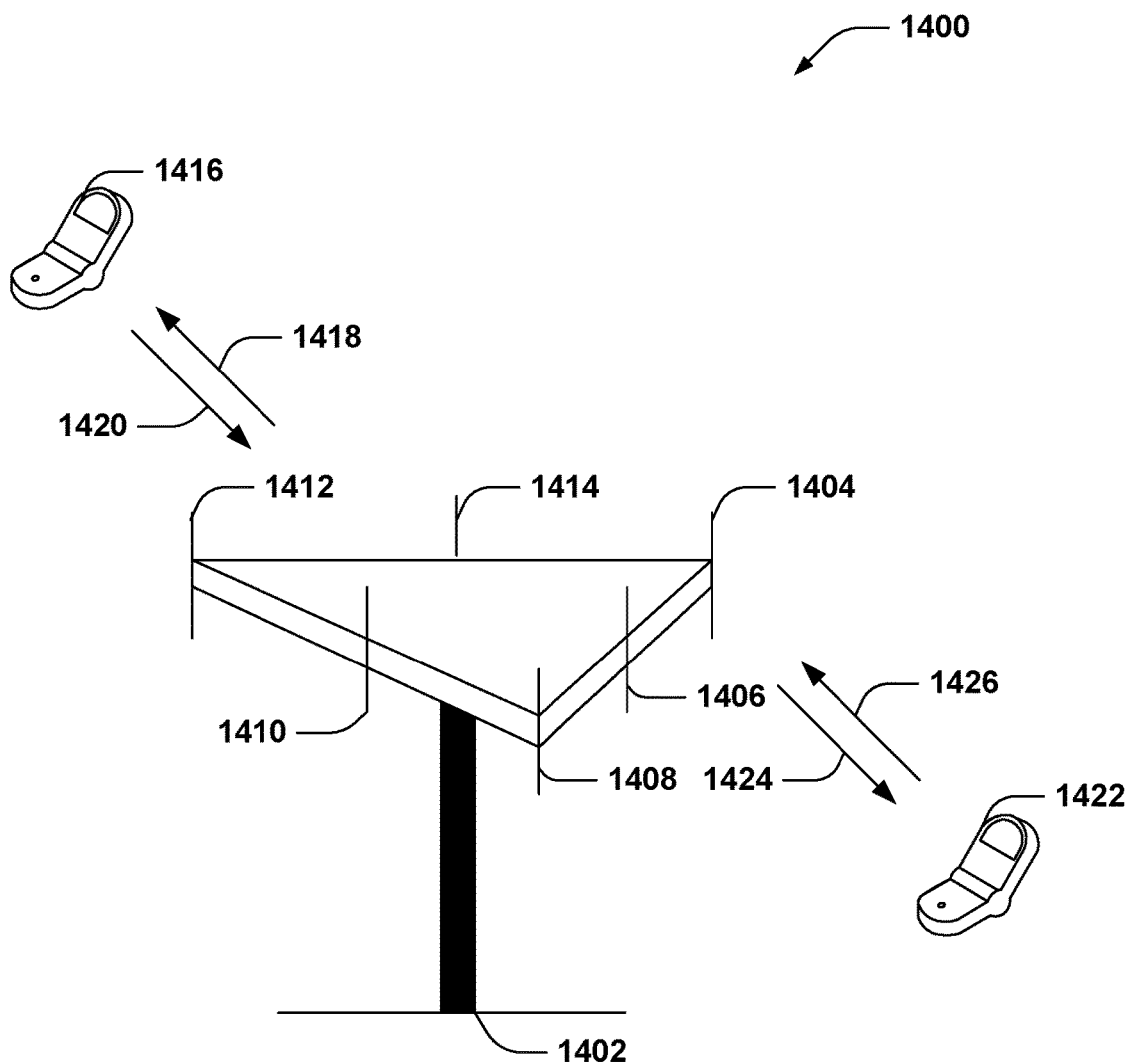
FIG. 14 illustrates an example wireless communication system in accordance with various aspects set forth herein.

FIG. 14 illustrates a wireless communication system 1400 in accordance with various embodiments presented herein. System 1400 comprises a base station 1402 that can include multiple antenna groups. For example, one antenna group can include antennas 1404 and 1406, another group can comprise antennas 1408 and 1410, and an additional group can include antennas 1412 and 1414. Two antennas are illustrated for each antenna group; however, more or fewer antennas can be utilized for each group. Base station 1402 can additionally include a transmitter chain and a receiver chain, each of which can in turn comprise a plurality of components associated with signal transmission and reception (e.g., processors, modulators, multiplexers, demodulators, demultiplexers, antennas, etc.), as is appreciated.

Base station 1402 can communicate with one or more mobile devices such as mobile device 1416 and mobile device 1422; however, it is to be appreciated that base station 1402 can communicate with substantially any number of mobile devices similar to mobile devices 1416 and 1422. Mobile devices 1416 and 1422 can be, for example, cellular phones, smart phones, laptops, handheld communication devices, handheld computing devices, satellite radios, global positioning systems, PDAs, and/or any other suitable device for communicating over wireless communication system 1400. As depicted, mobile device 1416 is in communication with antennas 1412 and 1414, where antennas 1412 and 1414 transmit information to mobile device 1416 over a forward link 1418 and receive information from mobile device 1416 over a reverse link 1420. Moreover, mobile device 1422 is in communication with antennas 1404 and 1406, where antennas 1404 and 1406 transmit information to mobile device 1422 over a forward link 1424 and receive information from mobile device 1422 over a reverse link 1426. In a frequency division duplex (FDD) system, forward link 1418 can utilize a different frequency band than that used by reverse link 1420, and forward link 1424 can employ a different frequency band than that employed by reverse link 1426, for example. Further, in a time division duplex (TDD) system, forward link 1418 and reverse link 1420 can utilize a common frequency band and forward link 1424 and reverse link 1426 can utilize a common frequency band.

Each group of antennas and/or the area in which they are designated to communicate can be referred to as a sector of base station 1402. For example, antenna groups can be designed to communicate to mobile devices in a sector of the areas covered by base station 1402. In communication over forward links 1418 and 1424, the transmitting antennas of base station 1402 can utilize beamforming to improve signal-to-noise ratio of forward links 1418 and 1424 for mobile devices 1416 and 1422. Also, while base station 1402 utilizes beamforming to transmit to mobile devices 1416 and 1422 scattered randomly through an associated coverage, mobile devices in neighboring cells can be subject to less interference as compared to a base station transmitting through a single antenna to all its mobile devices. Moreover, mobile devices 1416 and 1422 can communicate directly with one another using a peer-to-peer or ad hoc technology as depicted. According to an example, system 1400 can be a multiple-input multiple-output (MIMO) communication system.

Figure 15:
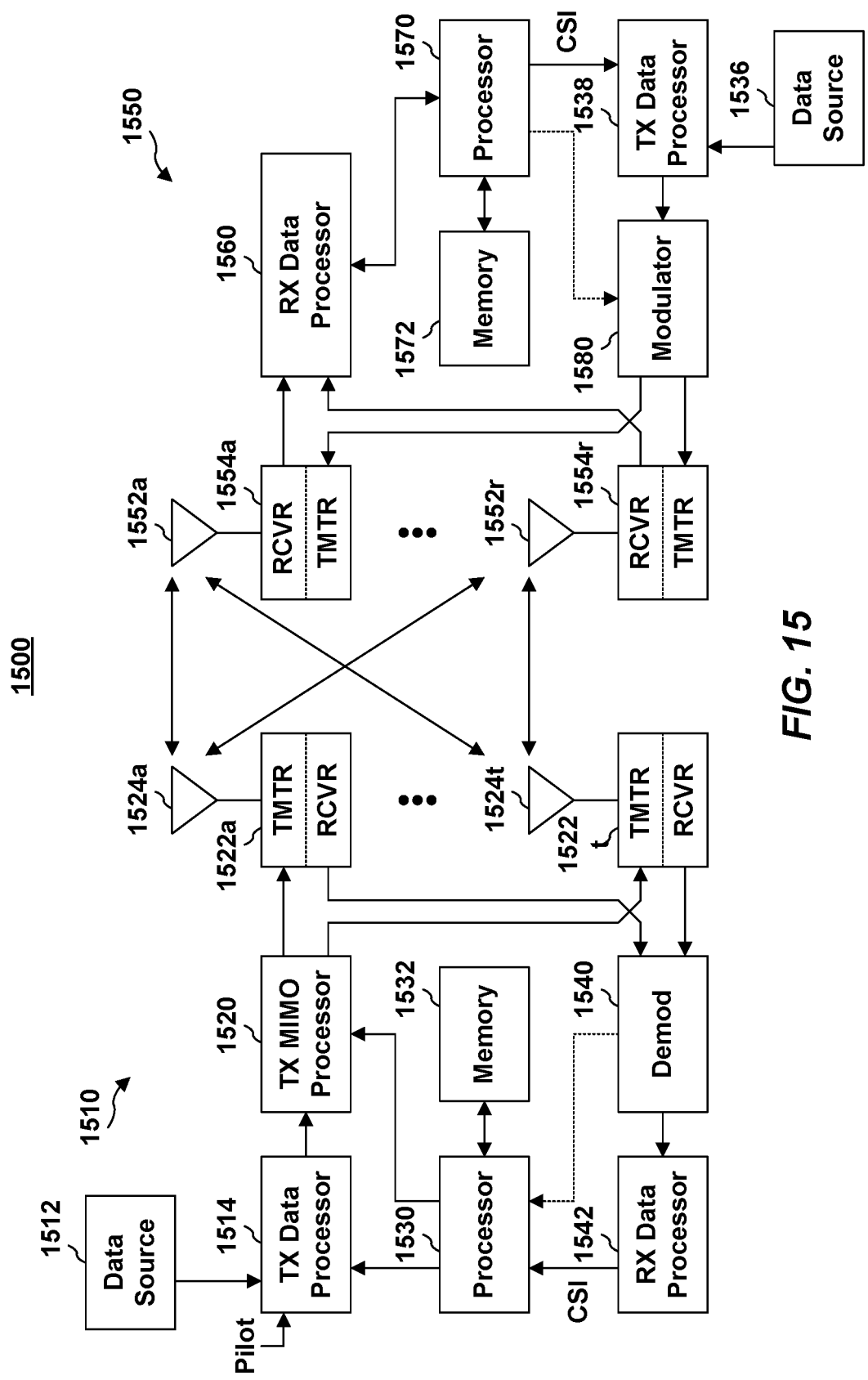
FIG. 15 illustrates an example wireless network environment that can be employed in conjunction with the various systems and methods described herein.

FIG. 15 shows an example wireless communication system 1500. The wireless communication system 1500 depicts one base station 1510 and one mobile device 1550 for sake of brevity. However, it is to be appreciated that system 1500 can include more than one base station and/or more than one mobile device, wherein additional base stations and/or mobile devices can be substantially similar or different from example base station 1510 and mobile device 1550 described below. In addition, it is to be appreciated that base station 1510 and/or mobile device 1550 can employ the systems (FIGS. 1-2, 4-5, and 11-14), mobile devices, (FIG. 10), base stations (FIG. 3), and/or methods (FIGS. 6-9) described herein to facilitate wireless communication there between. For example, components or functions of the systems and/or methods described herein can be part of a memory 1532 and/or 1572 or processors 1530 and/or 1570 described below, and/or can be executed by processors 1530 and/or 1570 to perform the disclosed functions.

At base station 1510, traffic data for a number of data streams is provided from a data source 1512 to a transmit (TX) data processor 1514. According to an example, each data stream can be transmitted over a respective antenna. TX data processor 1514 formats, codes, and interleaves the traffic data stream based on a particular coding scheme selected for that data stream to provide coded data.

The coded data for each data stream can be multiplexed with pilot data using orthogonal frequency division multiplexing (OFDM) techniques. Additionally or alternatively, the pilot symbols can be frequency division multiplexed (FDM), time division multiplexed (TDM), or code division multiplexed (CDM). The pilot data is typically a known data pattern that is processed in a known manner and can be used at mobile device 1550 to estimate channel response. The multiplexed pilot and coded data for each data stream can be modulated (e.g., symbol mapped) based on a particular modulation scheme (e.g., binary phase-shift keying (BPSK), quadrature phase-shift keying (QPSK), M-phase-shift keying (M-PSK), M-quadrature amplitude modulation (M-QAM), etc.) selected for that data stream to provide modulation symbols. The data rate, coding, and modulation for each data stream can be determined by instructions performed or provided by processor 1530.

The modulation symbols for the data streams can be provided to a TX MIMO processor 1520, which can further process the modulation symbols (e.g., for OFDM). TX MIMO processor 1520 then provides NT modulation symbol streams to NT transmitters (TMTR) 1522a through 1522t. In various embodiments, TX MIMO processor 1520 applies beamforming weights to the symbols of the data streams and to the antenna from which the symbol is being transmitted.

Each transmitter 1522 receives and processes a respective symbol stream to provide one or more analog signals, and further conditions (e.g., amplifies, filters, and upconverts) the analog signals to provide a modulated signal suitable for transmission over the MIMO channel. Further, NT modulated signals from transmitters 1522a through 1522t are transmitted from NT antennas 1524a through 1524t, respectively.

At mobile device 1550, the transmitted modulated signals are received by NR antennas 1552a through 1552r and the received signal from each antenna 1552 is provided to a respective receiver (RCVR) 1554a through 1554r. Each receiver 1554 conditions (e.g., filters, amplifies, and downconverts) a respective signal, digitizes the conditioned signal to provide samples, and further processes the samples to provide a corresponding "received" symbol stream.

An RX data processor 1560 can receive and process the NR received symbol streams from NR receivers 1554 based on a particular receiver processing technique to provide NT "detected" symbol streams. RX data processor 1560 can demodulate, deinterleave, and decode each detected symbol stream to recover the traffic data for the data stream. The processing by RX data processor 1560 is complementary to that performed by TX MIMO processor 1520 and TX data processor 1514 at base station 1510.

A processor 1570 can periodically determine which precoding matrix to utilize as discussed above. Further, processor 1570 can formulate a reverse link message comprising a matrix index portion and a rank value portion.

The reverse link message can comprise various types of information regarding the communication link and/or the received data stream. The reverse link message can be processed by a TX data processor 1538, which also receives traffic data for a number of data streams from a data source 1536, modulated by a modulator 1580, conditioned by transmitters 1554a through 1554r, and transmitted back to base station 1510.

At base station 1510, the modulated signals from mobile device 1550 are received by antennas 1524, conditioned by receivers 1522, demodulated by a demodulator 1540, and processed by a RX data processor 1542 to extract the reverse link message transmitted by mobile device 1550. Further, processor 1530 can process the extracted message to determine which precoding matrix to use for determining the beamforming weights.

Processors 1530 and 1570 can direct (e.g., control, coordinate, manage, etc.) operation at base station 1510 and mobile device 1550, respectively. Respective processors 1530 and 1570 can be associated with memory 1532 and 1572 that store program codes and data. Processors 1530 and 1570 can also perform computations to derive frequency and impulse response estimates for the uplink and downlink, respectively.

The various illustrative logics, logical blocks, modules, components, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but, in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Additionally, at least one processor may comprise one or more modules operable to perform one or more of the steps and/or actions described above. An exemplary storage medium may be coupled to the processor, such that the processor can read information from, and write information to, the storage medium. In the alternative, the storage medium may be integral to the processor. Further, in some aspects, the processor and the storage medium may reside in an ASIC. Additionally, the ASIC may reside in a user terminal. In the alternative, the processor and the storage medium may reside as discrete components in a user terminal.

In one or more aspects, the functions, methods, or algorithms described may be implemented in hardware, software, firmware, or any combination thereof. If implemented in software, the functions may be stored or transmitted as one or more instructions or code on a computer-readable medium, which may be incorporated into a computer program product. Computer-readable media includes both computer storage media and communication media including any medium that facilitates transfer of a computer program from one place to another. A storage medium may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, substantially any connection may be termed a computer-readable medium. For example, if software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave can be included in the definition of medium. Disk and disc, as used herein, includes compact disc (CD), laser disc, optical disc, digital versatile disc (DVD), floppy disk and blu-ray disc where disks usually reproduce data magnetically, while discs usually reproduce data optically with lasers. Combinations of the above should also be included within the scope of computer-readable media.

While the foregoing disclosure discusses illustrative aspects and/or embodiments, it should be noted that various changes and modifications could be made herein without departing from the scope of the described aspects and/or embodiments as defined by the appended claims. Furthermore, although elements of the described aspects and/or embodiments may be described or claimed in the singular, the plural is contemplated unless limitation to the singular is explicitly stated. Additionally, all or a portion of any aspect and/or embodiment may be utilized with all or a portion of any other aspect and/or embodiment, unless stated otherwise.

What is claimed is:

1. A method for providing shared scheduling request (SR) resources, comprising:
   grouping a plurality of user equipments (UEs) into at least one group of UEs for associating SR resources common for the at least one group of UEs;
   transmitting a plurality of identifiers including one or more contention-based group identifiers that identify the at least one group of UEs, each of the plurality of identifiers associated with one or more shared SR resources of a plurality of shared SR resources, wherein the one or more shared SR resources are for transmitting contention-based SRs associated with the one or more contention-based group identifiers, wherein the one or more shared SR resources are associated with the at least one group of UEs based on one or more channel conditions shared by each UE in the at least one group of UEs;
   transmitting a plurality of second identifiers, each of the plurality of second identifiers identifying the one or more shared SR resources;
   receiving scheduling information identifying a contention-based SR of the one or more shared SR resources from a UE over the one or more shared SR resources;
   transmitting an uplink grant to the UE based at least in part on the contention-based SR, wherein the uplink grant is associated with the one or more contention-based group identifiers; and
   receiving an uplink data transmission from the UE based on the uplink grant.

2. The method of claim 1, further comprising:
   receiving a different SR from a different UE over the one or more shared SR resources; and
   indicating a collision to the UE and the different UE.

3. The method of claim 2, further comprising:
   transmitting a configured prohibit timer to the UE based on the collision.

4. The method of claim 2, wherein the indicating the collision to the UE includes requesting retransmission of the scheduling information.

5. The method of claim 1, wherein the transmitting the plurality of second identifiers is performed at one or more predetermined time intervals.

6. An apparatus for providing shared scheduling request (SR) resources, comprising:
   a memory storing instructions; and
   at least one processor coupled with the memory and configured to execute the instructions to:
     group a plurality of user equipments (UEs) into at least one group of UEs for associating SR resources common for the at least one group of UEs;
     transmit a plurality of identifiers including one or more contention-based group identifiers that identify the at least one group of UEs, each of the plurality of identifiers associated with one or more shared SR resources of a plurality of shared SR resources, wherein the one or more shared SR resources are for transmitting contention-based SRs associated with the one or more contention-based group identifiers, wherein the one or more shared SR resources are associated with the at least one group of UEs based on one or more channel conditions shared by each UE in the at least one group of UEs;
     transmit a plurality of second identifiers, each of the plurality of second identifiers identifying the one or more shared SR resources;
     obtain scheduling information identifying a contention-based SR of the one or more shared SR resources from a UE over the one or more shared SR resources;
     provide an uplink grant to the UE based at least in part on the contention-based SR, wherein the uplink grant is associated with the one or more contention-based group identifiers; and
     receive an uplink data transmission from the UE based on the uplink grant.

7. The apparatus of claim 6, wherein the at least one processor is further configured to execute the instructions to:
   obtain a different SR from a different UE over the one or more shared SR resources; and
   indicate a collision to the UE and the different UE.

8. The apparatus of claim 7, wherein the at least one processor is further configured to execute the instructions to:
   transmit a configured prohibit timer to the UE based on the collision.

9. The apparatus of claim 7, wherein the at least one processor is further configured to execute the instructions to:
   request retransmission of the scheduling information.

10. The apparatus of claim 6, wherein the at least one processor is further configured to execute the instructions to:
    transmit the plurality of second identifiers at one or more predetermined time periods.

11. An apparatus for providing shared scheduling request (SR) resources, comprising:
    means for grouping a plurality of user equipments (UEs) into at least one group of UEs for associating SR resources common for the at least one group of UEs;
    means for transmitting a plurality of identifiers including one or more contention-based group identifiers that identify the at least one group of UEs, each of the plurality of identifiers associated with one or more shared SR resources of a plurality of shared SR resources, wherein the one or more shared SR resources are for transmitting contention-based SRs associated with the one or more contention-based group identifiers, wherein the one or more shared SR resources are associated with the at least one group of UEs based on one or more channel conditions shared by each UE in the at least one group of UEs;
    means for transmitting a plurality of second identifiers, each of the plurality of second identifiers identifying the one or more shared SR resources;
    means for receiving scheduling information identifying a contention-based SR of the one or more shared SR resources from a UE over the one or more shared SR resources;
    means for transmitting an uplink grant to the UE based at least in part on the contention-based SR, wherein the uplink grant is associated with the one or more contention-based group identifiers; and
    means for receiving an uplink data transmission from the UE based on the uplink grant.

12. The apparatus of claim 11, further comprising means for indicating a collision to the UE, wherein the means for receiving scheduling information is configured to receive a different SR from a different UE over the one or more shared SR resources.

13. The apparatus of claim 12, further comprising:
    means for transmitting a configured prohibit timer to the UE based on the collision.

14. The apparatus of claim 12, wherein the means for indicating the collision to the UE is configured to request retransmission of the scheduling information.

15. The apparatus of claim 11, wherein the means for transmitting the plurality of second identifiers is configured to transmit the plurality of second identifiers at one or more predetermined time periods.

16. A non-transitory computer-readable medium for providing shared scheduling request (SR) resources, the non-transitory computer-readable medium storing computer executable code, comprising code to:

- group a plurality of user equipments (UEs) into at least one group of UEs for associating SR resources common for the at least one group of UEs;
- transmit a plurality of identifiers including one or more contention-based group identifiers that identify the at least one group of UEs, each of the plurality of identifiers associated with one or more shared SR resources of a plurality of shared SR resources, wherein the one or more shared SR resources are for transmitting contention-based SRs associated with the one or more contention-based group identifiers, wherein the one or more shared SR resources are associated with the at least one group of UEs based on one or more channel conditions shared by each UE in the at least one group of UEs;
- provide a plurality of second identifiers, each of the plurality of second identifiers identifying the one or more shared SR resources;
- obtain scheduling information identifying a contention-based SR of the one or more shared SR resources from a UE over the one or more shared SR resources;
- provide an uplink grant to the UE based at least in part on the contention-based SR, wherein the uplink grant is associated with the one or more contention-based group identifiers; and
- receive an uplink data transmission from the UE based on the uplink grant.

17. The non-transitory computer-readable medium of claim 16, further comprising code to:

- obtain a different SR from a different UE over the one or more shared SR resources; and
- indicate a collision to the UE and the different UE.

18. The non-transitory computer-readable medium of claim 17, further comprising code to:

- transmit a configured prohibit timer to the UE based on the collision.

19. The non-transitory computer-readable medium of claim 17, further comprising code to:

- requesting retransmission of the scheduling information.

20. The non-transitory computer-readable medium of claim 16, further comprising code to:

- provide the plurality of second identifiers at one or more predetermined time periods.

* * * * *